US009497472B2

United States Patent
Coban et al.

(10) Patent No.: US 9,497,472 B2
(45) Date of Patent: Nov. 15, 2016

(54) PARALLEL CONTEXT CALCULATION IN VIDEO CODING

(75) Inventors: Muhammed Zeyd Coban, Carlsbad, CA (US);
(Continued)

(73) Assignee: QUALCOMM Incorporated, San Diego, CA (US)

( * ) Notice: Subject to any disclaimer, the term of this patent is extended or adjusted under 35 U.S.C. 154(b) by 726 days.

(21) Appl. No.: 13/294,869

(22) Filed: Nov. 11, 2011

(65) Prior Publication Data

US 2012/0121011 A1 May 17, 2012

Related U.S. Application Data

(60) Provisional application No. 61/414,245, filed on Nov. 16, 2010, provisional application No. 61/426,440, filed on Dec. 22, 2010.

(51) Int. Cl.
*H04N 19/436* (2014.01)
*H04N 19/176* (2014.01)
(Continued)

(52) U.S. Cl.
CPC .......... *H04N 19/436* (2014.11); *H04N 19/102* (2014.11); *H04N 19/129* (2014.11);
(Continued)

(58) Field of Classification Search
CPC ................... H04N 19/00012; H04N 19/00109; H04N 19/00121; H04N 19/00278;
(Continued)

(56) References Cited

U.S. PATENT DOCUMENTS

| 6,054,943 A | 4/2000 | Lawrence |
| 6,532,306 B1 | 3/2003 | Boon et al. |

(Continued)

FOREIGN PATENT DOCUMENTS

| JP | 2000013609 A | 1/2000 |
| JP | 2010004284 A | 1/2010 |

OTHER PUBLICATIONS

Chengjie Tu et al: "Context-Based Entropy Coding of Block Transform Coeffcients for Image Compressin", IEEE Transactions on Image Processing, IEE Service Center, Piscataway, NJ, US, vol. 11, No. 11, Nov. 1, 2002, XP011074327, ISSN: 1057-7149.*

(Continued)

*Primary Examiner* — Christopher S Kelley
*Assistant Examiner* — Asmamaw G Tarko
(74) *Attorney, Agent, or Firm* — Shumaker & Sieffert, P.A.

(57) ABSTRACT

In one example, a method for coding video data includes identifying a scan path for scanning significance information associated with a quantized transform coefficient. The method also includes determining a context support neighborhood for entropy coding the significance information associated with the quantized transform coefficient, wherein the context support neighborhood excludes one or more context support elements that are located in the scan path. The method also includes coding the significance information using the modified context support neighborhood.

38 Claims, 16 Drawing Sheets

(75) Inventors: Yunfei Zheng, San Diego, CA (US);
Joel Sole Rojals, La Jolla, CA (US);
Rajan Laxman Joshi, San Diego, CA (US); Marta Karczewicz, San Diego, CA (US)

(51) Int. Cl.
| | |
|---|---|
| *H04N 19/196* | (2014.01) |
| *H04N 19/13* | (2014.01) |
| *H04N 19/134* | (2014.01) |
| *H04N 19/129* | (2014.01) |
| *H04N 19/102* | (2014.01) |
| *H04N 19/463* | (2014.01) |
| *H04N 19/18* | (2014.01) |

(52) U.S. Cl.
CPC ............ *H04N 19/13* (2014.11); *H04N 19/134* (2014.11); *H04N 19/176* (2014.11); *H04N 19/18* (2014.11); *H04N 19/196* (2014.11); *H04N 19/463* (2014.11)

(58) Field of Classification Search
CPC .................. H04N 19/00296; H04N 19/00369; H04N 19/00521; H04N 19/00551
USPC ........................................................ 375/240
See application file for complete search history.

(56) References Cited

U.S. PATENT DOCUMENTS

| | | | |
|---|---|---|---|
| 6,795,584 | B2 | 9/2004 | Karczewicz et al. |
| 6,870,963 | B2 | 3/2005 | Govindaswamy et al. |
| 7,379,608 | B2* | 5/2008 | Marpe .................. H04N 19/196 375/E7.138 |
| 8,913,666 | B2* | 12/2014 | Sole Rojals et al. .... 375/240.18 |
| 8,976,861 | B2 | 3/2015 | Sole Rojals et al. |
| 9,042,440 | B2 | 5/2015 | Sole Rojals et al. |
| 9,106,913 | B2 | 8/2015 | Sole Rojals et al. |
| 9,167,253 | B2 | 10/2015 | Sole Rojals et al. |
| 9,338,449 | B2 | 5/2016 | Sole Rojals et al. |
| 2002/0173952 | A1 | 11/2002 | Mietens et al. |
| 2004/0022446 | A1 | 2/2004 | Taubman |
| 2004/0066974 | A1* | 4/2004 | Karczewicz et al. .......... 382/239 |
| 2005/0068208 | A1* | 3/2005 | Liang et al. ..................... 341/65 |
| 2005/0078754 | A1* | 4/2005 | Liang et al. .............. 375/240.18 |
| 2006/0078049 | A1* | 4/2006 | Bao et al. ................. 375/240.11 |
| 2006/0256854 | A1 | 11/2006 | Jiang |
| 2008/0002767 | A1* | 1/2008 | Schwarz et al. ......... 375/240.12 |
| 2008/0013622 | A1* | 1/2008 | Bao et al. ..................... 375/240.1 |
| 2008/0089421 | A1* | 4/2008 | Je-Chang et al. ........ 375/240.22 |
| 2009/0232211 | A1* | 9/2009 | Chen et al. ............... 375/240.13 |
| 2009/0257489 | A1 | 10/2009 | Karczewicz et al. |
| 2010/0124284 | A1* | 5/2010 | Lee et al. .................. 375/240.18 |
| 2010/0135389 | A1* | 6/2010 | Tanizawa et al. ........ 375/240.12 |
| 2010/0177820 | A1* | 7/2010 | Chono et al. ............. 375/240.03 |
| 2010/0284459 | A1 | 11/2010 | Jeong et al. |
| 2011/0206135 | A1* | 8/2011 | Drugeon .............. H04N 19/176 375/240.24 |
| 2011/0280314 | A1 | 11/2011 | Sankaran et al. |
| 2012/0008683 | A1* | 1/2012 | Karczewicz et al. .... 375/240.12 |
| 2012/0163455 | A1 | 6/2012 | Zheng et al. |
| 2012/0163456 | A1 | 6/2012 | Coban et al. |
| 2012/0163469 | A1* | 6/2012 | Kim et al. ................ 375/240.18 |
| 2012/0163472 | A1 | 6/2012 | Sole Rojals et al. |
| 2012/0230417 | A1 | 9/2012 | Sole Rojals et al. |
| 2012/0230418 | A1 | 9/2012 | Sole Rojals et al. |
| 2012/0230420 | A1 | 9/2012 | Sole Rojals et al. |
| 2013/0003835 | A1 | 1/2013 | Sole Rojals et al. |
| 2013/0051475 | A1 | 2/2013 | Joshi et al. |
| 2013/0182772 | A1 | 7/2013 | Seregin et al. |
| 2013/0188699 | A1 | 7/2013 | Joshi et al. |
| 2013/0230097 | A1 | 9/2013 | Sole Rojals et al. |
| 2014/0086307 | A1 | 3/2014 | Karczewicz et al. |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "High Efficiency Video Coding (HEVC) text specification draft 10," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

International Preliminary Report on Patentability—PCT/US2011/060619, The International Bureau of WIPO—Geneva, Switzerland, Jan. 29, 2013, 11 pp.

Reply to Written Opinion dated Jan. 26, 2012, from International application No. PCT/US2011/060619, filed Sep. 13, 2012, 21 pp.

Second Written Opinion from International application No. PCT/US2011/060619, dated Nov. 6, 2012, 6 pp.

Response to Second Written Opinion dated Nov. 6, 2012, from International application No. PCT/US2011/060619, filed Jan. 4, 2013, 20 pp.

Seregin et al., "Low Complexity Adaptive Coefficients Scanning," Samsung Electronics Co.,Ltd, Joint Collaborative Team on Video Coding, Oct. 7-15, 2010, 4 pp.

Anonymous, "Test Model under Consideration," Joint Collaborative Team on Video Coding, Document: JCTVC-B205, Jul. 28, 2010, 152 pp.

Auyeung, C. et al., "Parallel processing friendly simplified context selection of significance map," Joint Collaborative Team on Video Coding, Document: JCTVC-D260, Jan. 16, 2011, 6 pp.

Chengji, T. et al., "Context-Based Entropy Coding of Block Transform Coefficients for Image Compression," IEEE Transactions on Image Processing, vol. 11, No. 11, Nov. 1, 2002, 13 pp.

Chujoh, T. et al., "Description of video coding technology proposal by Toshiba," Joint Collaborative Team on Video Coding, Document: JCTVC-A117r1, Apr. 15-23, 2010, 38 pp.

International Search Report and Written Opinion of international application No. PCT/US2011/060619, dated Jan. 26, 2012, 19 pp.

Lou, J. et al., "Parallel processing friendly context modeling for significance map coding in CABAC," Joint Collaborative Team on Video Coding, Document: JCTVC-D241, Jan. 18, 2011, 4 pp.

Kung, M.C. et al., "Block Based Parallel Motion Estimation Using Programmable Graphics Hardware", IEEE Audio, Language and Image Processing, Jul. 7, 2008, 5 pp.

Lou, J. et al., "Zigzag Scan for CABAC/PIPE," Joint Collaborative Team on Video Coding, Document: JCTVC-C114, Oct. 28, 2010, 4 pp.

(56) References Cited

OTHER PUBLICATIONS

Cheung, N.G. et al., "Highly Parallel Rate-Distortion Optimized Intra-Mode Decision on Multicore Graphics Processor", IEEE Transactions on Circuits and Systems for Video Technology, vol. 19, No. 11, Nov. 1, 2009, 12 pp.

Sole Rojals, J. et al., "Parallel Context Processing for the significance map in high coding efficiency," Joint Collaborative Team on Video Coding, Document: JCTVC-D262, Jan. 16, 2011, 4 pp.

Turaga, D. et al., "Parallel processing of multi-dimensional data with causal neighborhood dependencies," Visual Communications and Image Processing, SPIE vol. 6822, No. 682219-1, Jan. 28, 2008, 7 pp.

Winken, M. et al., "Video coding technology proposal by Fraunhofer HHI", Joint Collaborative Team on Video Coding, Document: JCTVC-A116, Apr. 15-23, 2010, 44 pp.

Ye, Y. et al., "Improved intra coding," International Telecommunications Union—Telecommunications Standardization Sector, Document VCEG-AG11, Oct. 20, 2007, 6 pp.

Yeo, C. et al., "Mode-Dependent Coefficient Scanning for Intra Prediction Residual Coding," Joint Collaborative Team on Video Coding, Document: JCTVC-D049, Jan. 14, 2011,7 pp.

Yu, Y. et al., "Adaptive Scan for Large Blocks for HEVC", Joint Collaborative Team on Video Coding, Document: JCTVC-F569, Jul. 16, 2011, 6 pp.

Wei, Y.C. et al., "Adaptive mode-dependent scan for H.264/AVC intracoding," Journal of Electronic Imaging, vol. 19, No. 3, Aug. 11, 2010, 12 pp.

Zeng, B. et al., "Directional Discrete Cosine Transforms for Image Coding," IEEE International Conference on Multimedia and Expo, Jul. 1, 2006, 4 pp.

Zheng, Y. et al., "CE11: Mode Dependent Coefficient Scanning," Joint Collaborative Team on Video Coding, Document: JCTVC-D393, Jan. 16, 2011, 4 pp.

Jia, J. et al., "Adaptive Transform Coefficient Scan for H.264 Intra Coding," Institute of Electronics, Information, and Communication Engineers, vol. E90-D, No. 10, Oct. 2007, 3 pp.

Karczewicz, M. et al., "Video Coding Technology Proposal by Qualcomm Inc.," JCT-VC, Document JCTVC-A121, Apr. 2010, 24 pp.

Lee, Y. et al., "Adaptive Scanning for H.264/AVC Intra Coding," ETRI Journal, vol. 28, No. 5, Oct. 2006, 4 pp.

McCann, K. et al., "Samsung's Response to the Call for Proposals on Video Compression Technology," JCT-VC, Document JCTVC-A124, Apr. 2010, 42 pp.

Seregin, V. et al., "Low-complexity adaptive coefficients scanning," JCT-VC, Document JCTVC-C205, Oct. 2010, 4 pp.

Sze, V. et al, "TE-8: Evaluation of RIM parallel context processing (PCP) proposal," JCT-VC, Document JCTVC-C063, Oct. 2010, 4 pp.

Sze, V. et al., "Parallelization of HHI_Transform_Coding," JCT-VC, Document JCTVC-C227, Oct. 2010, 11 pp.

Budagavi et al., "TE8: TI Parallel context processing (PCP) proposal," JCTVC-C062, Oct. 7-15, 2010, 7 pp.

Tu C., et al., "Context-Based Entropy Coding of Block Transform Coefficients for Image Compression", IEEE Transactions on Image Processing, Nov. 2002, vol. 11, No. 11, pp. 1271-1283.

Notice of Ground for Rejection from counterpart Korean Application No. 2013-7015526, dated Jul. 25, 2014, 11 pp.

First Office Action from counterpart Japanese Application No. 2013-539929, dated Jul. 1, 2014, 11 pages.

Taiwan Search Report—TW100141505—TIPO—Jun. 18, 2014, 8 pages.

Notice of Grounds for Rejection from corresponding Korean Application Serial No. 2013-7015526 dated Feb. 26, 2015 (6 pages).

Final Office Action from corresponding Japanese Application Serial No. 2013-539929 dated Mar. 31, 2015 (9 pages).

Bossen F., "Common test conditions and software reference configurations," JCT-VC, Document: JCTVC-B300, 2nd Meeting: Geneva, CH, Jul. 21-28, 2010, 12 Pages.

Budagavi M., et al., "Description of video coding technology proposal by Texas Instruments Inc.", JCTVC-A101, Joint Collaborative Team on Video Coding meeting, Apr. 15-23, 2010, Dresden, Germany, 45 Pages.

He D., et al., "Video Coding Technology Proposal by RIM," JCTVC-A120, Joint Collaborative Team on Video Coding meeting, Apr. 15-23, 2010, Dresden, Germany, 29 pages.

JCT-VC, "Test Model under Consideration", JCTVC-A205, Joint Collaborative Team on Video Coding meeting, Apr. 15-23, 2010, Dresden, Germany, 171 pages.

Segall A., et al., "A Highly Efficient and Highly Parallel System for Video Coding", [online], Joint Collaborative Team on Video Coding (JCT-VC) of ITU-T SG16 WP3 and ISO/IEC JTC1/SC29/WG11, Apr. 23, 2010, Document: JCTVC-A105, pp. 1-47, URL: http://phenix.int-evry.fr/jct/doc_end_user/documents/1_Dresden/wg11/JCTVC-A105.zip.

Sze et al., "Massively Parallel CABAC," Document VCEG-AL21, 38th Meeting: London, UKI Geneva, CH, Jul. 1-8, 2009, 10 pp.

Sze V., et al., "TE12: Evaluation of transform coefficient coding (HHI_TRANSFORM_CODING with tool breakdown", JCTVC-C059, 3rd JCT-VC Meeting, Guangzhou, CN, Oct. 2010, 10 Pages.

Sze V., et al., "Parallel CABAC", ITU-T SG 16/Q.6 Doc. COM16-C334, Geneva, Switzerland, Apr. 2008, 10 pages.

Decision of Rejection from corresponding Japanese Application Serial No. 2013-539929 dated Aug. 4, 2015 including translation (4 pages).

Decision of Dismissal of Amendment from corresponding Japanese Application Serial No. 2013-539929 dated Aug. 4, 2015 including translation (7 pages).

Notice of Grounds for Rejection from corresponding Korean Application Serial No. 2013-7015526 dated Sep. 30, 2015 including translation (8 pages).

Marpe D., et al., "Context-based adaptive binary arithmetic coding in the H.264/AVC video compression standard", IEEE Transactions on Circuits and Systems for Video Technology, IEEE Service Center, pp. 620-636, XP011099255, vol. 13 (7), Jul. 2003.

* cited by examiner

| 1 | 2 | 4 | 7 | 11 | 16 | 22 | 29 |
| --- | --- | --- | --- | --- | --- | --- | --- |
| 3 | 5 | 8 | 12 | 17 | 23 | 30 | 37 |
| 6 | 9 | 13 | 18 | 24 | 31 | 38 | 44 |
| 10 | 14 | 19 | 25 | 32 | 39 | 45 | 50 |
| 15 | 20 | 26 | 33 | 40 | 46 | 51 | 55 |
| 21 | 27 | 34 | 41 | 47 | 52 | 56 | 59 |
| 28 | 35 | 42 | 48 | 53 | 57 | 60 | 62 |
| 36 | 43 | 49 | 54 | 58 | 61 | 63 | 64 |

| 1  | 2  | 3  | 5  | 7  | 10 | 13 | 16 |
|----|----|----|----|----|----|----|----|
| 4  | 6  | 8  | 11 | 14 | 17 | 19 | 22 |
| 9  | 12 | 15 | 18 | 20 | 23 | 25 | 28 |
| 21 | 24 | 26 | 29 | 31 | 34 | 37 | 40 |
| 27 | 30 | 32 | 35 | 38 | 41 | 43 | 46 |
| 33 | 36 | 39 | 42 | 44 | 47 | 49 | 52 |
| 45 | 48 | 50 | 53 | 55 | 57 | 59 | 61 |
| 51 | 54 | 56 | 58 | 60 | 62 | 63 | 64 |

| 1 | 4 | 9 | 21 | 27 | 33 | 45 | 51 |
|---|---|---|----|----|----|----|----|
| 2 | 6 | 12 | 24 | 30 | 36 | 48 | 54 |
| 3 | 8 | 15 | 26 | 32 | 39 | 50 | 56 |
| 5 | 11 | 18 | 29 | 35 | 42 | 53 | 58 |
| 7 | 14 | 20 | 31 | 38 | 44 | 55 | 60 |
| 10 | 17 | 23 | 34 | 41 | 47 | 57 | 62 |
| 13 | 19 | 25 | 37 | 43 | 49 | 59 | 63 |
| 16 | 22 | 28 | 40 | 46 | 52 | 61 | 64 |

PARALLEL CONTEXT CALCULATION IN VIDEO CODING

This application claims the benefit of U.S. Provisional Application No. 61/414,245, filed 16 Nov. 2010, and U.S. Provisional Application No. 61/426,440, filed 22 Dec. 2010, the content of which are hereby incorporated by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the upcoming High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into coding units, which may also be generally referred to as blocks. Each block can be further partitioned. Blocks in an intra-coded (I) frame or slice are encoded using spatial prediction with respect to neighboring reference blocks in the same frame or slice. Blocks in an inter-coded (P or B) frame or slice may use spatial prediction with respect to neighboring blocks in the same frame or slice or temporal prediction with respect to other reference frames.

SUMMARY

In general, this disclosure describes techniques for coding video data. In particular, the techniques of this disclosure relate to entropy coding video data. For example, aspects of this disclosure relate to determining a context support neighborhood for entropy coding quantized transform coefficients. In one example, techniques of this disclosure relate to ensuring that the context support neighborhood for entropy coding significance information associated with one or more transform coefficients positioned along a particular scan path do not include context support elements positioned in the scan path. With no context support elements in the scan path, the contexts for coding significance information associated with all of the quantized transform coefficients positioned in the scan path can be calculated in parallel (e.g., parallel context calculation). Aspects of this disclosure also relate to generating a scan order for scanning significance information associated with transformed residual video data. For example, aspects of this disclosure include generating a scan order that allows context of plurality of significance flags to be calculated in parallel, thereby enabling context prefetching for significance flag coding. According to some aspects of this disclosure, such a scan order may also facilitate coding of multiple significance flags using speculative computation.

In one example, a method for coding video data comprises identifying a scan path for scanning significance information associated with a quantized transform coefficient; determining a context support neighborhood for entropy coding the significance information associated with the quantized transform coefficient, wherein the context support neighborhood excludes one or more context support elements that are located in the scan path; and coding the significance information using the modified context support neighborhood.

In another example, an apparatus for coding video data comprises one or more processors configured to identify a scan path for scanning significance information associated with a quantized transform coefficient; determine a context support neighborhood for entropy coding the significance information associated with the quantized transform coefficient, wherein the context support neighborhood excludes one or more context support elements that are located in the scan path; and code the significance information using the modified context support neighborhood.

In another example, an apparatus for coding video data comprises means for identifying a scan path for scanning significance information associated with a quantized transform coefficient; means for determining a context support neighborhood for entropy coding the significance information associated with the quantized transform coefficient, wherein the context support neighborhood excludes one or more context support elements that are located in the scan path; and means for coding the significance information using the modified context support neighborhood.

In another example, a computer program product comprises a computer-readable medium having stored thereon instructions that, when executed, cause one or more processors to identify a scan path for scanning significance information associated with a quantized transform coefficient; determine a context support neighborhood for entropy coding the significance information associated with the quantized transform coefficient, wherein the context support neighborhood excludes one or more context support elements that are located in the scan path; and code the significance information using the modified context support neighborhood.

In another example, a method of coding video data includes determining a context neighborhood for coding significance information associated with a block of transform coefficients; determining a priority metric configured to influence an orientation of a scan order for scanning the significance information; determining a number of parallel threads for scanning the significance information; and generating the scan order for scanning the significance information based on the context neighborhood, the priority metric, and the number of parallel threads.

In another example, an apparatus for coding video data includes one or more processors configured to determine a context neighborhood for coding significance information associated with a block of transform coefficients; determine a priority metric configured to influence an orientation of a scan order for scanning the significance information; determine a number of parallel threads for scanning the significance information; and generate the scan order for scanning the significance information based on the context neighborhood, the priority metric, and the number of parallel threads.

In another example, an apparatus for coding video data includes a means for determining a context neighborhood for coding significance information associated with a block of transform coefficients; means for determining a priority metric configured to influence an orientation of a scan order for scanning the significance information; means for determining a number of parallel threads for scanning the significance information; and means for generating the scan order for scanning the significance information based on the context neighborhood, the priority metric, and the number of parallel threads.

In another example, a computer program product includes a computer-readable medium having stored thereon instructions that, when executed, cause one or more processors to determine a context neighborhood for coding significance information associated with a block of transform coefficients; determine a priority metric configured to influence an orientation of a scan order for scanning the significance information; determine a number of parallel threads for scanning the significance information; and generate the scan order for scanning the significance information based on the context neighborhood, the priority metric, and the number of parallel threads.

The details of one or more examples are set forth in the accompanying drawings and the description below. Other features, objects, and advantages will be apparent from the description and drawings, and from the claims.

DETAILED DESCRIPTION

Figure 1:
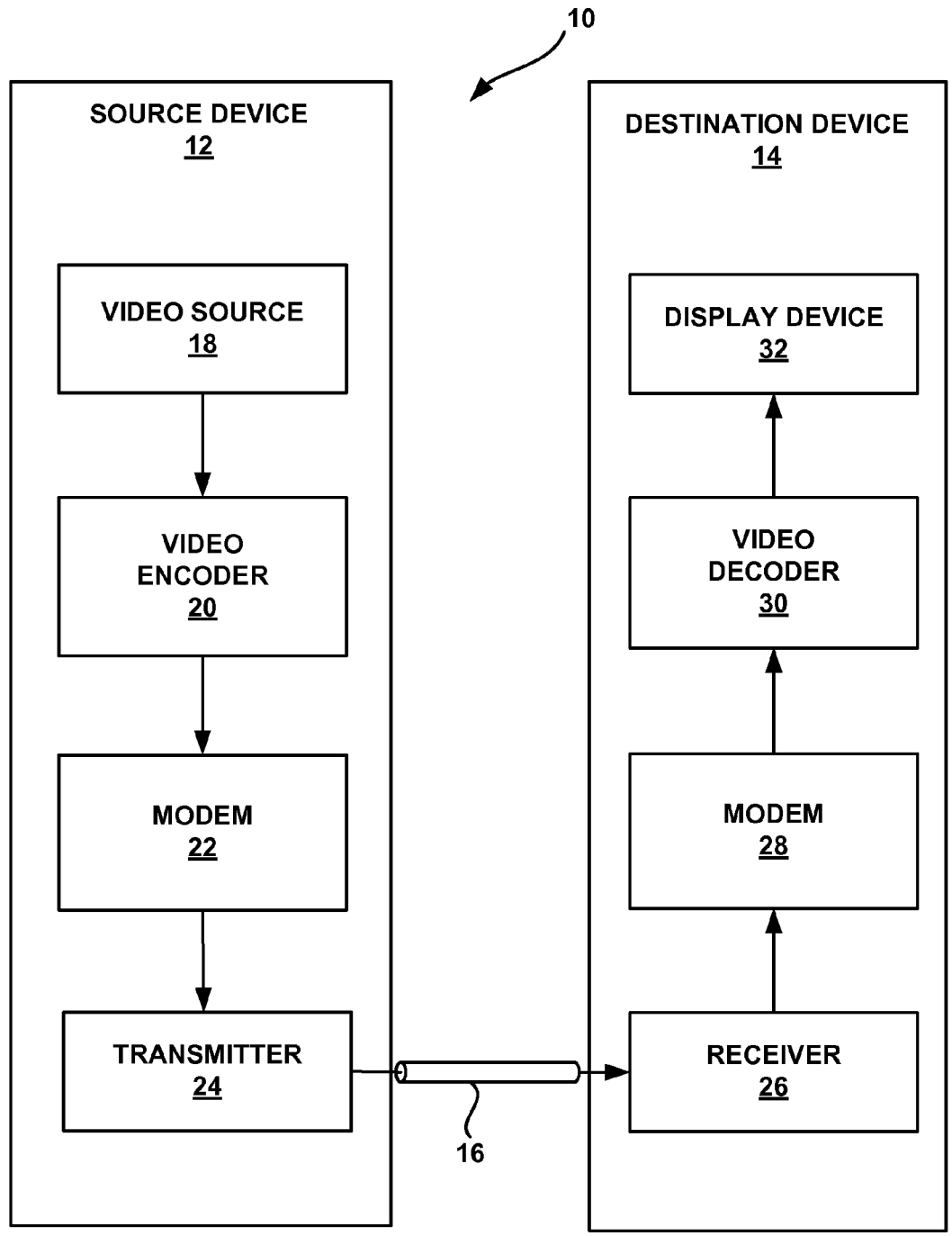
FIG. 1 is a block diagram illustrating an example video encoding and decoding system that may utilize techniques for efficiently scanning and entropy coding significance information in parallel.

In general, this disclosure describes techniques for coding video data. More specifically, this disclosure describes techniques relating to generating a scan order for scanning transform coefficients associated with transformed residual video data. Encoded video data may include prediction data and residual data. A video encoder may produce the prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting pixel values for a block of a picture relative to pixel values of a previously coded picture.

Following intra- or inter-prediction, a video encoder may calculate residual pixel values for the block. The residual values generally correspond to differences between the predicted pixel value data and the actual pixel value data of the block being coded, i.e., the coded block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block. To further compress the residual values of a block, the residual value may be transformed into a set of transform coefficients. The transform converts the residual values of the pixels from the spatial domain to a transform domain. The transform coefficients correspond to a two-dimensional matrix of coefficients that is ordinarily the same size as the original block.

In other words, there may be just as many transform coefficients in the transform domain block as pixels in the original pixel domain block.

The video encoder may then quantize the transform coefficients to further compress the video data. Quantization generally involves mapping values within a relatively large range to values in a relatively small range, thus reducing the amount of data needed to represent the quantized transform coefficients. In some cases, quantization may reduce some values to zero. Following quantization, the video encoder may scan the quantized transform coefficients, producing a one-dimensional vector from the two-dimensional matrix of the quantized transform coefficients.

The video encoder may then entropy encode the resulting array to even further compress the data. In some examples, the video encoder may be configured to use variable length codes (VLCs) to represent various possible quantized transform coefficients of the array, e.g., using context-adaptive variable-length coding (CAVLC). In other examples, the video encoder may be configured to use binary arithmetic coding to encode the resulting quantized coefficients, e.g., using context-adaptive binary arithmetic coding (CABAC). In still other examples, the video encoder may be configured to encode quantized transform coefficients using Probability Interval Partitioning Entropy Codes (PIPE).

Context adaptive coding, such as CABAC, PIPE, or other context adaptive coding schemes, typically involve selecting a context model that operates on context to encode symbols associated with a block of video data. Context may relate to, for example, whether values are zero or non-zero for symbols neighboring a symbol currently being coded. A context model may be associated with a particular probability model.

In H.264/AVC and the emerging High Efficiency Video Coding (HEVC) standard, entropy coding may include identifying the positions of significant transform coefficients (i.e., nonzero transform coefficients) in a block. In some examples, the relative positions of significance transform coefficients may be encoded prior to the levels (e.g., values) of the coefficients. The process of coding the locations of the significant coefficients may be referred to as significance map coding. The significance map (SM) may include a "map" of one's and zero's, where the one's indicate locations of significant coefficients. For example, a significance map (SM) for a block of video data may include a two-dimensional array of binary values, i.e., ones and zeros, in which the ones indicate positions of significant coefficients within the block, and the zeros indicate positions of non-significant, or zero-valued coefficients within the block. The ones and zeros of the significance map may be referred to as "significant coefficient flags." Additionally, the significance map may include another two-dimensional array of ones and zeros, in which a one indicates a position of a last significant coefficient within the block according to a scanning order associated with the block, and the zeros indicate positions of all other coefficients within the block. In this case, the ones and zeros are referred to as "last significant coefficient flags."

After the significance map is coded, a level of each residual transform coefficient (e.g., represented as an absolute value and a sign) may be coded. For example, to code significance map information, level information, sign information, and the like, the video encoder may convert an absolute value of each non-zero residual transform coefficient into binary form (which may be referred to "binarizing"), e.g., using a unary code (or other code) comprising one or more bits, or "bins." Each significant coefficient flag and last significant coefficient flag for the block already comprises a single bin, and thus may bypass binarization.

Each bin for a block of video data, whether corresponding to residual transform coefficient level or syntax information for the block, is coded using probability estimates for the bin that indicate a likelihood of the bin having a given value (e.g., "0" or "1"). The probability estimates are included within a probability model, also referred to as a "context model." The probability model is selected by determining a context for the bin, which may be identified by a context support neighborhood. That is, a context support neighborhood may identify the relative positions of context for entropy coding a particular symbol or flag associated with a transform coefficient. The context (e.g., the actual values located in the context neighborhood positions) determine the probability model.

Accordingly, as described above, coding a transform coefficient may include coding a number of flags and/or symbols, such as flags and/or symbols representing significance, level, sign, and the like, associated with a transform coefficient. Accordingly, it should be understood that general references made herein to the process of coding transform coefficients made herein may refer to any or all of coding significance flags, levels, last significant coefficient flags, signs, or other information associated with the transform coefficients.

As noted above, efforts are currently in progress to develop a new video coding standard, currently referred to as High Efficiency Video Coding (HEVC). The upcoming standard is also sometimes informally referred to as ITU-T H.265, although such a designation has not been formally made. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

HM refers to a block of video data as a coding unit (CU). Syntax data within a bitstream may define a largest coding unit (LCU), which is a largest coding unit in terms of the number of pixels. In general, a CU has a similar purpose to a macroblock coded according to H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure also uses the term "block" to refer to any of a CU, PU, or TU.

In general, the techniques of this disclosure relate to scanning and entropy coding video data. That is, for example, the techniques of this disclosure may relate to scanning and entropy coding significance information associated with quantized transform coefficients of a TU, as well as other information such as a sign associated with quantized transform coefficients, a level of the quantized transform coefficients, whether a particular quantized transform coefficient is a last significant coefficient in a block of transform coefficient, and the like.

In an example, techniques of this disclosure relate to ensuring that the context support neighborhood for entropy coding significance information associated with one or more transform coefficients positioned along a particular scan path do not include context support elements positioned in the scan path. That is, for example, the techniques of this disclosure include determining a context support neighborhood that allows parallel context calculation for significance flags associated with all of the transform coefficients in a particular scan path. Such a context support neighborhood may enable context pre-fetching, and may also facilitate coding of multiple significance flags using speculative computation. For example, with no context support elements in a particular scan path, the contexts for coding significance information associated with all of the quantized transform coefficients positioned in the scan path can be calculated in parallel (e.g., which may be referred to as "parallel context calculation"). Eliminating context support elements from a particular scan path may also enable pre-fetching of contexts for all the transform coefficients positioned in the scan path (e.g., which may be referred to as "context pre-fetching"), and may facilitate coding of multiple significance flags using speculative computation. One example, of speculative computation is described in JCTVC-0062, "TE8: TI Parallel Context Processing (PCP) Proposal," $3^{rd}$ JCT-VC Meeting, Guangzhou, CN, October 2010, available publically at http://phenix.int-evry.fr/jct/doc_end_user/currentdocument.php?id=1131. Such concepts may be referred to in this disclosure as supporting parallel coding of significance information.

In another example, the techniques of this disclosure may also relate to generating a scan order for scanning significance information associated with transformed residual video data. Aspects of this disclosure may include generating a scan order that allows parallel context calculation, thereby enabling context pre-fetching for significance flag coding. According to some aspects of this disclosure, such a scan order may also facilitate coding of multiple significance flags using speculative computation. As noted above, such concepts may be referred to in this disclosure as supporting parallel coding of significance information.

This disclosure generally refers to "significance information" as information that indicates whether a quantized transform coefficient is non-zero. For example, as noted above, following transformation and quantization certain residual values associated with a block of video data may be reduced to zero. The remaining non-zero quantized transform coefficients may be referred to as "significant." A video encoder may identify such non-zero quantized transform coefficients using significance flags. That is, the video encoder may set a significance flag for each position of a two-dimensional transform coefficient matrix. The video encoder may set a significance flag to a value of one for a position in which the quantized transform coefficient is non-zero. Alternatively, the video encoder may set a significance flag to a value of zero for a position in which the quantized transform coefficient is zero. The resulting two-dimensional grid of significance flags (e.g., corresponding to the grid of quantized transform coefficients) may be referred to as a significance map, as described above.

This disclosure also generally refers to a "context support neighborhood" (e.g., also referred to as a "context template"), which identifies context for entropy coding a particular symbol or flag associated with a transform coefficient (e.g., a sign of a transform coefficient, a level of a transform coefficient, a significance flag, a flag indicating whether a particular quantized transform coefficient is a last significant coefficient, and the like). For example, context adaptive binary arithmetic coding (CABAC) typically involves selecting a context model that operates on context to encode symbols associated with a block of video data. Context may relate to, for example, whether values are zero or non-zero for symbols neighboring a symbol currently being coded. The context support neighborhood may identify the relative positions of the context elements with respect to the symbol currently being encoded. That is, for example, a context support neighborhood may identify the positions of five previously coded symbols that neighbor the symbol currently being encoded (e.g., typically positioned above and to the left of the symbol currently being encoded). The context includes the values of symbols in such neighboring positions.

In addition, this disclosure generally refers to a "scan order" as an order in which a particular symbol or flag associated with a transform coefficient (e.g., a sign of a transform coefficient, a level of a transform coefficient, a significance flag, a flag indicating whether a particular quantized transform coefficient is a last significant coefficient, and the like) are serialized from a two-dimensional block or matrix to a one-dimensional array. For example, the scan order may identify a sequence in which transform coefficients are serialized by referring to the relative positions of the significance flags and transform coefficients in the two-dimensional matrix as the transform coefficients are serialized.

This disclosure may also refer to a "scan path" as a path in which a particular symbol or flag associated with a transform coefficient (e.g., a sign of a transform coefficient, a level of a transform coefficient, a significance flag, a flag indicating whether a particular quantized transform coefficient is a last significant coefficient, and the like) are serialized from a two-dimensional matrix to a one-dimensional array. That is, the scan path may identify a sequence in which transform coefficients are serialized by referring to a traced path through the two-dimensional matrix (e.g., a diagonal path that crosses a block of transform coefficients at a 45 degree angle). Accordingly, a scan path may have a particular orientation with respect to, for example, a block of transform coefficients. That is, a scan path may be referred to as being diagonally oriented if the scan path crosses a block of transform coefficients at a 45 degree angle. Similarly, a scan path may be referred to as being horizontally oriented if the scan path crosses a block of transform coefficients from left to right (or vice versa) along a horizontal line. A scan path may be referred to as being vertically oriented if the scan path crosses a block of transform coefficients from top to bottom (or vice versa) along a vertical line.

In some examples, a scan path may refer generally to a single traversal across a particular block of transform coefficients in the scan order. Accordingly, a block of transform coefficients may include more than one scan path. In an example for purposes of illustration, an 8×8 block of transform coefficients that is scanned using a horizontally oriented scan order may have eight scan paths (e.g., one horizontally oriented scan path for each row of transform coefficients).

The terms "scan order" and "scan path" may both be used to describe the manner in which a two-dimensional matrix of transform coefficients are serialized, and may be used interchangeably herein.

The techniques of this disclosure include determining a context support neighborhood that allows parallel calculation of contexts for coding significance flags of transform coefficients in a scan path. According to some aspects of the disclosure, a video coder may initially identify a scan path for scanning significance information associated with quantized transform coefficients of a block of video data. That is, for a particular TU, the video coder may determine a scan path having a particular directional orientation to serialize significance information (e.g., significance flags). Examples include a diagonally oriented scan path, a vertically oriented scan path, and a horizontally oriented scan path.

After identifying the scan path, the video coder may determine whether the context support neighborhood includes any elements positioned in the scan path. For example, as noted above, the video coder may serialize significance information and other information related to transform coefficients (e.g., sign, level, and the like) by scanning the significance information and other information related to transform coefficients using a diagonally oriented pattern (e.g., from the relative top right corner of a TU to the bottom left corner of the TU). Other diagonally oriented patterns such as top right to bottom left and zig-zag also may be used. A video coder may determine whether the context support neighborhood includes any elements along the diagonal scan path. That is, for a particular transform coefficient position of the TU, the video coder may determine whether the context support neighborhood includes elements that neighbor the particular transform coefficient position to the upper right (e.g., at a 45 degree angle) or lower left (e.g., at a 45 degree angle).

As described in greater detail below, relying on such context neighborhood support elements (e.g., elements along the scan path) may impede the ability of the video coder to calculate contexts for significance information in parallel because all data in the context support neighborhood must be available (e.g., already coded) for enabling parallel calculation of contexts. If the context support neighborhood includes elements along the scan path, a coder may be forced to wait for a context support element in the scan path, which precedes the position currently being coded, to finish coding before determining the context for the current position. This delay reduces the ability of the video coder to efficiently process significance information.

Accordingly, aspects of this disclosure relate to optimizing the context support neighborhood for parallel context calculation by excluding context support neighborhood elements that are located in a path defined by the scan direction (e.g., the "scan path") from being considered during coding. When no elements of the context support neighborhood are included in the scan path, an entropy coder can calculate all the contexts for significance information along the scan path in parallel. This is because all of the information needed belongs to previously coded significance information associated with a previously coded scan path (or paths).

Other aspects of this disclosure include determining a scan order that allows the calculation of contexts for significance information in parallel. For example, the techniques of this disclosure include generating a scan order that enables calculation of the contexts for more than one significance flag at the same time.

A scan order for parallel calculation of contexts for significance information may be developed based on a number of variables. In an example, a scan order for parallel context calculation may be generated based on a predefined context support neighborhood, a primary priority metric for influencing an orientation of the scan order, a secondary priority metric for further influencing the orientation of the scan order, and a predefined number of parallel threads (e.g., a desired number of contexts for significance flags that are to be calculated in parallel). As described in greater detail below, by altering one or more of the input variables to the scan order generation process, scan orders that allow for parallel calculation of contexts for significance information ("parallel friendly") can be produced that exhibit a variety of different orientations.

As described herein, "parallel friendly" may generally refer to the ability to determine a context support neighborhood and/or a scan order that allows parallel context calculation for significance flags (or other information associated with the transform coefficients, such as sign, level, and the like) associated with more than one transform coefficient in parallel. In addition, "parallel friendly" may also generally refer to the ability to perform pre-fetching of contexts for more than one transform coefficient, which may facilitate coding of multiple significance flags using speculative computation.

The context support neighborhood, as noted above, may identify the context for entropy coding a particular symbol or flag. That is, when entropy coding significance information, the context support neighborhood may identify the relative positions of the context elements with respect to the significance flag currently being coded. In some instances, the context support neighborhood may be fixed.

The primary priority metric may be designed to influence the orientation of the generated scan order. For example, a scan order orientation may indicate the general order in which significance information is scanned. That is, if a scan order is vertically oriented, significance information associated with transform coefficients to the relative left of a block of video data may be favored over (e.g., scanned prior to) significance information associated with transform coefficients to the relative right of the block. For example, the significance information associated with the left most column of quantized transform coefficients may be completely scanned before the significance information associated with the right most column of quantized transform coefficients. In another example, if a scan order is horizontally oriented, significance information associated with transform coefficients to the relative top of a block of video data may be favored over (e.g., scanned prior to) significance information associated with transform coefficients to the relative bottom of the block. For example, the significance information associated with the top row of quantized transform coefficients may be completely scanned before the significance information associated with the bottom row of quantized transform coefficients. In another example, if a scan order is diagonally oriented, significance information associated with transform coefficients to the relative top-left portion of a block of video data may be favored over (e.g., scanned prior to) significance information associated with transform coefficients to the relative bottom-right portion of the block.

According to some aspects of the disclosure, the primary priority metric may include a function that is applied during the scan order generation process that may influence the orientation of the generated scan order. That is, in an example, the primary priority metric may be a function that favors scanning significance information along a row of transform coefficients over significance information along a column of transform coefficients. The secondary priority metric may include another function that is also applied during the scan order generation process that may further influence the orientation of the generated scan. In some examples, the secondary priority metric may be applied as a tiebreaker. That is, if the primary priority metric indicates that two significance flags have equal priority (e.g., according to the primary priority metric), the secondary priority metric may be applied to resolve such ties.

The number of parallel threads input to the scan order generation process may be used to influence an amount of parallelism that the generated scan order can support. For example, the number of parallel threads input may be a predefined constant (e.g., two, three, four, and the like), that influences the amount of parallelism that the generated scan can support. That is, a number of parallel threads input of two may produce a scan order that allows two significance flags to be efficiently entropy coded in parallel. Similarly, a number of parallel threads input of three may produce a scan order that allows three significance flags to be efficiently entropy coded in parallel, and so on.

According to some aspects of the disclosure, varying one or more of the elements used to develop the parallel friendly scan order (e.g., the context support neighborhood, the primary priority metric, the secondary priority metric, and the desired number of parallel threads) may change the orientation of the resulting scan order. For example, altering the primary priority metric and/or secondary priority metric may change the orientation of the resulting scan order. That is, given a particular context support neighborhood, the primary priority metric and/or secondary priority metric may be varied to generate a horizontal, vertical, or diagonally oriented scan.

In this way, this disclosure describes techniques for generating parallel friendly scan orders having different orientations. Implementing parallel friendly scan orders having different orientations may increase the efficiency of the scan from both a coding and parallelization perspective. For example, generally the most efficient scan orders pack non-zero transform coefficients toward the front of a serialized array, thereby increasing entropy coding efficiency. Moreover, generally the most efficient scan orders have relatively long runs of zero-valued transform coefficients, thereby further increasing entropy coding efficiency. That is, packing the non-zero transform coefficients toward the front of the serialized array of transform coefficients, as well as increasing runs of zero-valued transform coefficients may allow the transform coefficients to be signaled with fewer bits.

A scan order that is only designed to pack non-zero transform coefficients toward the front of the array and create long runs of zeros, however, may not necessarily be parallel friendly. For example, a particular scan order may pack non-zero transform coefficients toward the front of an array, but may not be optimized for parallel calculation of contexts for coding significance flags. That is, the scan order may not be parallel friendly if the context support neighborhood of a significance flag being coded in parallel with a second significance flag relies on the second significance flag. As noted above, to efficiently entropy code significance information in parallel, all data in the context support neighborhood must be available (e.g., already coded).

Techniques of this disclosure relate to generating and implementing a number of parallel friendly scan orders having different orientations. The parallel friendly scans may be generated, for example, in a design environment by varying one or more of the elements used to develop the parallel friendly scans. One or more of these parallel friendly scan orders may be stored and used by video encoders and decoders when scanning and entropy coding video data. The video coder may select a scan from a number of stored parallel friendly scans based on explicit signaling of the scan orientation or other factors such as intra prediction mode.

In an example, after intra-prediction it may be beneficial to scan transform coefficients based on the intra-prediction mode used for prediction. That is, even after a separable directional transform is applied to a two dimensional matrix of residual values, the resulting two dimensional transform coefficient matrix may still exhibit some directionality. Consider, for example, predicting a CU using a vertical intra-prediction mode. After prediction, transform, and quantization, the nonzero quantized transform coefficients associated with the CU may tend to exist along the horizontal direction (e.g., along the relative top of the two dimensional matrix). Accordingly, it may be beneficial to scan the transform coefficients in the horizontal direction so that the non-zero coefficients in the two dimensional matrix can be further compacted toward the beginning of the resulting one dimensional vector.

According to some aspects of this disclosure, a developer in a design environment may develop a parallel friendly scan order having a particular orientation by first determining a number of desired parallel threads. The developer may then select a context support neighborhood, primary priority function, and secondary priority function to produce a scan order that exhibits the particular orientation. As noted above, in some examples, a number of parallel friendly scan orders may be developed and stored for use by video encoders and decoders to when scanning and entropy coding video data. In general, parallel friendly scan orders may enable parallel calculation of contexts for significance information. For example, a parallel friendly scan order may enable prefetching of multiple contexts and facilitate speculative computation for entropy coding multiple significance flags.

In operation, a video coder may select a particular parallel friendly scan order having a particular orientation that has the highest potential of increasing entropy coding efficiency while enabling parallel calculation of contexts for significance information. The selection may be made, in some examples, based on a coding metric such as a prediction mode used to predict the video data or a particular transform applied during the transformation process.

According to some aspects of the disclosure, a parallel friendly scan order is applied during entropy coding to entropy code significance information. Such a scan order may enable parallel calculation of contexts for significance information. For example, a parallel friendly scan order may enable pre-fetching of multiple contexts and facilitates speculative computation for entropy coding multiple significance flags simultaneously. Examples of CABAC schemes for entropy coding of multiple significance flags are described in JCTVC-C227, "Parallelization of HHI Transform Coding," $3^{rd}$ JCT-VC Meeting, Guangzhou, CN, October 2010, available publically at http://phenix.int-evry.fr/jct/doc_end_user/current_document.php?id=1330 and incorporated by reference in its entirety, as well as JCTVC-O062, "TE8: TI Parallel Context Processing (PCP) Proposal," $3^{rd}$ JCT-VC Meeting, Guangzhou, CN, October 2010, available publically at http://phenix.int-evry.fr/jct/doc_end_user/current_document.php?id=1131 and incorporated by reference in its entirety.

FIG. 1 is a block diagram illustrating an example video encoding and decoding system 10 that may utilize techniques for efficiently scanning and entropy coding significance information. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern efficiently scanning and entropy coding significance information, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for encoding and decoding of transform units of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for efficiently scanning and entropy coding significance information in parallel may be performed by any digital video encoding and/or decoding device. Although the techniques of this disclosure are generally performed by a video encoding device or a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein for efficiently scanning and entropy coding significance information in parallel. The information communicated over channel 16 may include syntax information defined by video encoder 20, which is also used by video decoder 30, that includes syntax elements that describe characteristics and/or processing of coding units or other units of coded video data, e.g., groups of pictures (GOPs), slices, frames and the like. A quadtree data structure may form part of the syntax information for a largest coding unit. That is, each LCU may include syntax information in the form of a quadtree, which may describe how the LCU is split into sub-CUs as well as signaling information on how the LCU and sub-CUs are encoded.

Video decoder 30 may use the quadtree to determine how to decode CUs of a received picture. Video decoder 30 may then decode the CUs and send decoded video data to display device 32. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). As another example, video encoder 20 and video decoder 30 may operate according to the High Efficiency Video Coding (HEVC) standard, and may conform to the HEVC Test Model (HM). The techniques of this disclosure, however, are not limited to any particular coding standard, and may apply to HEVC or other standards or proprietary coding processes that are currently available or may emerge in the future. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented in software, a device may store instructions for the software in a suitable, non-transitory computer-readable medium and execute the instructions using one or more processors to perform the techniques of this disclosure. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on coding units within individual video frames in order to encode the video data. A coding unit may correspond to an LCU or a sub-CU, and the term CU may refer to an LCU or a sub-CU. Header information for an LCU may describe the size of the LCU, the number of times the LCU may be split (referred to as CU depth in this disclosure), and other information. Each video frame may include a plurality of slices, and each slice may include a plurality of LCUs.

In this disclosure, "N×N" and "N by N" may be used interchangeably to refer to the pixel dimensions of a block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a positive integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. In some cases, TU may refer to the residual data in the spatial domain as well. The residual data generally represents pixel differences between values of a PU and the values of collocated, unencoded pixels from the input video data. The TUs may include quantized values in the transform domain. When a DCT is used to transform the coefficients of a TU, the coefficients of the TU may be said to be in the frequency domain.

Video encoder 20 may implement any or all of the techniques of this disclosure for efficiently scanning and entropy coding significance information. Likewise, video decoder 30 may implement any or all of these techniques for efficiently scanning and entropy coding significance information. That is, according to some aspects of this disclosure, the video decoder 30 may operate in a manner that is symmetrical to video encoder 20.

Video encoder 20 may receive an LCU and determine whether to split the LCU into four quadrants, each comprising a sub-CU, or whether to encode the LCU without splitting. Following a decision to split an LCU into sub-CUs, video encoder 20 may determine whether to split each sub-CU into four quadrants, each comprising a sub-CU. Video encoder 20 may continue to recursively determine whether to split a CU, with a maximum number of splits indicated by the LCU depth. Video encoder 20 may provide a quadtree data structure indicative of the splitting of an LCU and sub-CUs of the LCU. The LCU may correspond to a root node of the quadtree. Each node of the quadtree may correspond to a CU of the LCU. Moreover, each node may include a split flag value indicative of whether the corresponding CU is split.

If the LCU is split, for example, video encoder 20 may set the value of the split flag in the root node to indicate that the LCU is split. Then, video encoder 20 may set values of child nodes of the root node to indicate which, if any, of the sub-CUs of the LCU are split. A CU that is not split may correspond to a leaf node of the quadtree data structure, where a leaf node has no child nodes.

Video encoder 20 may encode each sub-CU of the LCU corresponding to a leaf node in the quadtree data structure. For purposes of example, this disclosure describes the techniques relative to intra-prediction encoding. Thus, under this assumption, video encoder 20 may form prediction units (PUs) for each CU corresponding to a leaf node in the quadtree data structure. In some examples, video encoder 20 may select one of thirty-five different intra-prediction modes for the LCU and signal the selected intra-prediction mode in the root node of the quadtree. Then, for each CU corresponding to a leaf node, video encoder 20 may determine whether to form one PU having the same size as the CU, or to form four PUs representing quadrants of the CU. Each PU corresponds to prediction data retrieved from neighboring, previously coded CUs, according to the selected intra-prediction mode.

Following intra-predictive or inter-predictive coding to produce a PU for a CU, video encoder 20 may calculate residual data to produce one or more transform units (TUs) for the CU. The residual data may correspond to pixel differences between pixels of the unencoded picture and prediction values of a PU of a CU. Video encoder 20 may form one or more TUs including the residual data for the CU. Video encoder 20 may then transform the TUs. Video encoder 20 may select a transform based on an intra-prediction mode used to intra-mode predict a PU for the CU. In some examples, video encoder 20 may be configured to apply more than one transform to a TU, that is, a cascaded transform.

By transforming residual data for a TU, video encoder 20 produces a matrix of transform coefficients. This matrix generally has the same size as the input block to the transform. In general, the transform process prepares the residual data for quantization, which further compresses the data. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients (e.g., significance, level, sign, last significance coefficient, and the like) to produce a vector that can be entropy encoded. For example, video encoder 20 may apply a diagonal (zig-zag or top-right to bottom-left or bottom-left to top-right) pattern, a horizontally oriented pattern, or a vertically oriented pattern to scan the quantized transform coefficients.

According to some aspects of the disclosure, rather than apply a predefined scan order, video encoder 20 may generate a parallel friendly scan order, or may be preprogrammed with a number of parallel friendly scan orders. For example, video encoder 20 may generate a scan order for enabling parallel calculation of significance flag contexts using a number of variables. In some examples, as described in greater detail with respect to FIGS. 9-10B, video encoder 20 may generate the parallel friendly scan order based on a predefined context support neighborhood, a primary priority metric for influencing an orientation of the scan order, a secondary priority metric for further influencing the orientation of the scan order, and a predefined number of parallel threads.

In another example, video encoder 20 may apply one of a number of stored parallel friendly scan orders, which may be generated using the scan order generation techniques described in this disclosure. That is, video encoder 20 may be preprogrammed with a number of parallel friendly scan orders developed, for example, in a design environment. Video encoder 20 may select a particular parallel friendly scan order based on, for example, another coding metric (e.g., a prediction mode, a transform, and the like).

After and/or during the scanning of the transform matrix to form a one-dimensional vector, video encoder 20 may entropy encode the one-dimensional vector, e.g., according to CAVLC, CABAC, PIPE, syntax-based context-adaptive binary arithmetic coding (SBAC), or another entropy coding methodology.

To perform CAVLC, video encoder 20 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, video encoder 20 may select a context model to apply to a certain context to encode symbols to be transmitted. The context may relate to, for example, whether neighboring values are non-zero or not. Video encoder 20 may also entropy encode syntax elements, such as significance information including a significant coefficient flag and a last coefficient flag.

In addition, when performing CABAC, PIPE, or another context adaptive scheme, video encoder 20 may determine and apply a context support neighborhood. According to aspects of this disclosure, video encoder 20 may apply a context support neighborhood that supports efficient parallel calculation of contexts for significance information. In an example, video encoder 20 may identify the predefined directional scan (e.g., a diagonal scan) applied during scanning and determine whether the context support neighborhood includes any elements positioned in the scan path. As described in greater detail below, relying on such context neighborhood support elements (e.g., elements positioned in the scan path) may impede the ability of the video coder to calculate significance context information in parallel, because video encoder 20 may be forced to wait for one element to be encoded before it can determine the significance flag context for the next element. This delay reduces the ability of the video coder to calculate significance flag contexts in parallel.

Video decoder 30 may operate in a manner essentially symmetrical to that of video encoder 20. For example, video decoder 30 may receive entropy encoded data representative of an encoded CU, including encoded PU and TU data. Video decoder 30 may inverse entropy encode the received data, forming decoded quantization coefficients. When video encoder 20 entropy encodes data using a variable length code algorithm, video decoder 30 may use one or more VLC tables to determine a symbol corresponding to a received codeword. When video encoder 20 entropy encodes data using an arithmetic coding algorithm, video decoder 30 may use a context model to decode the data, which may correspond to the same context model used by video encoder 20 to encode the data. Moreover, video decoder 30 may apply a context support neighborhood in the same manner as video encoder 20.

Video decoder 30 may then scan the decoded coefficients, using a scan that mirrors the scan used by video encoder 20 to generate a two-dimensional array of transform coefficients from a serialized array of transform coefficients. For example, according to aspects of this disclosure, video decoder 30 may generate a parallel friendly scan order, or may be preprogrammed with a number of parallel friendly scan orders. For example, video decoder 30 may generate a scan order for enabling parallel calculation of significance flag contexts using a number of variables. In some examples, as described in greater detail with respect to FIGS. 9-10B, video decoder 30 may generate the parallel friendly scan order based on a predefined context support neighborhood, a primary priority metric for influencing an orientation of the scan order, a secondary priority metric for further influencing the orientation of the scan order, and a predefined number of parallel threads.

In another example, video decoder 30 may apply one of a number of stored parallel friendly scan orders, which may be generated using the scan order generation techniques described in this disclosure. That is, video decoder 30 may be preprogrammed with a number of parallel friendly scan orders developed, for example, in a design environment. Video decoder 30 may select a particular parallel friendly scan order based on, for example, another coding metric (e.g., a prediction mode, a transform, and the like).

Video decoder 30 may thereby form a two-dimensional matrix, from the one-dimensional vector resulting from the entropy decoding process. Next, video decoder 30 may inverse quantize the coefficients in the two-dimensional matrix produced by the scan. Video decoder 30 may then apply one or more inverse transforms to the two-dimensional matrix. The inverse transforms may correspond to the transforms applied by video encoder 20. Video decoder 30 may determine the inverse transforms to apply based on, for example, the intra-prediction mode used to form the PU, and if multiple transforms are available for a TU of a particular size, information signaled at the root of a quadtree corresponding to the CU currently being decoded.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
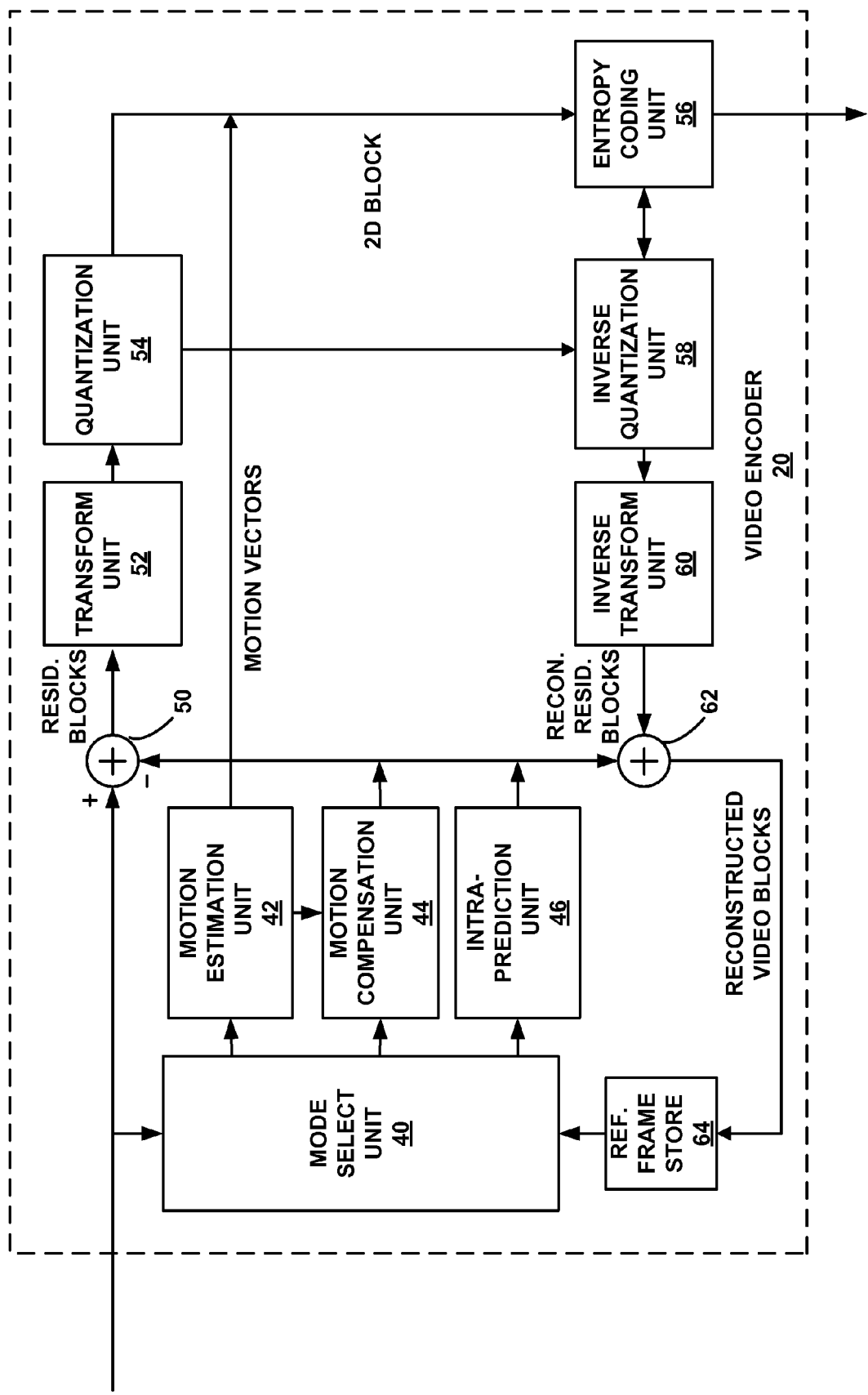
FIG. 2 is a block diagram illustrating an example of video encoder that may implement any or all of the techniques for efficiently scanning and entropy coding significance information in parallel described in this disclosure.

FIG. 2 is a block diagram illustrating an example of video encoder 20 that may implement any or all of the techniques for efficiently scanning and entropy coding significance information described in this disclosure. Video encoder 20 may perform intra- and inter-coding of CUs within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, intra-prediction unit 46, reference frame store 64, summer 50, transform unit 52, quantization unit 54, coefficient scanning unit 55, and entropy coding unit 56. Transform unit 52 illustrated in FIG. 2 is the unit that performs the actual transformation, not to be confused with a TU of a CU. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use in a reference frame. Some video frames may be designated I-frames, where all blocks in an I-frame are encoded in an intra-prediction mode. In some cases, intra-prediction unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample is a block that is found to closely match the portion of the CU including the PU being coded in terms of pixel difference, which may be determined by sum of absolute difference (SAD), sum of square difference (SSD), or other difference metrics. Motion compensation, performed by motion compensation unit 44, may involve fetching or generating values for the prediction unit based on the motion vector determined by motion estimation. Again, motion estimation unit 42 and motion compensation unit 44 may be functionally integrated, in some examples.

Motion estimation unit 42 calculates a motion vector for a prediction unit of an inter-coded frame by comparing the prediction unit to reference samples of a reference frame stored in reference frame store 64. In some examples, video encoder 20 may calculate values for sub-integer pixel positions of reference frames stored in reference frame store 64. For example, video encoder 20 may calculate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision. Motion estimation unit 42 sends the calculated motion vector to entropy coding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction unit 46 may intra-prediction encode the received block, as an alternative to inter-prediction performed by motion estimation unit 42 and motion compensation unit 44. Intra-prediction unit 46 may encode the received block relative to neighboring, previously coded blocks, e.g., blocks above, above and to the right, above and to the left, or to the left of the current block, assuming a left-to-right, top-to-bottom encoding order for blocks. Intra-prediction unit 46 may be configured with a variety of different intra-prediction modes. For example, intra-prediction unit 46 may be configured with a certain number of directional prediction modes, e.g., 35 directional prediction modes, based on the size of the CU being encoded.

Intra-prediction unit 46 may select an intra-prediction mode by, for example, calculating error values or rate-distortion (e.g., attempting to maximize compression without exceeding a predetermined distortion) for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction unit 46 may calculate an error value for the prediction mode based on pixel differences between the PU and the received block to be encoded. Intra-prediction unit 46 may continue testing intra-prediction modes until an intra-prediction mode that yields an acceptable error value is discovered. Intra-prediction unit 46 may then send the PU to summer 50.

Video encoder 20 forms a residual block by subtracting the prediction data calculated by motion compensation unit 44 or intra-prediction unit 46 from the original video block being coded. Summer 50 represents the component or components that perform this subtraction operation. The residual block may correspond to a two-dimensional matrix of values, where the number of values in the residual block is the same as the number of pixels in the PU corresponding to the residual block. The values in the residual block may correspond to the differences between collocated pixels in the PU and in the original block to be coded.

Transform unit 52 may form one or more transform units (TUs) from the residual block. Transform unit 52 applies a transform, such as a discrete cosine transform (DCT), a directional transform, or a conceptually similar transform, to the TU, producing a video block comprising transform coefficients. Accordingly, transform unit 52 may select a transform to apply to the TU based on the indication of the intra-prediction mode received from intra-prediction unit 46.

Transform unit 52 may send the resulting transform coefficients to quantization unit 54. Quantization unit 54 may then quantize the transform coefficients. As noted above, quantization generally involves mapping values within a relatively large range to values in a relatively small range, thus reducing the amount of data needed to represent the quantized transform coefficients. In some cases, quantization may reduce some values to zero.

Following quantization, entropy coding unit 56 may scan the quantized transform coefficients to serialize the quantized transform coefficients from a two-dimensional matrix to a one-dimensional array. Syntax elements associated with the transform coefficients may include a significant coefficient flag that indicates whether a particular coefficient is significant (e.g., non-zero) and a last coefficient flag that indicates whether a particular coefficient is the last coefficient scanned. In some instances, entropy coding unit 56 may signal the position of the last significant coefficient, followed by signaling a significance map, followed by signaling coefficient levels and/or sign. In some examples, entropy coding unit 56 may scan the significance map in the same order as the quantized transform coefficients levels. In other examples, entropy coding unit 56 may scan the significance map in the opposite direction as the quantized transform coefficient levels.

In general, entropy coding unit 56 may apply a predefined directional scan pattern to scan the quantized transform coefficients. In an example, entropy coding unit 56 may apply a diagonal (zig-zag) pattern to scan the quantized transform coefficients, as shown and described, for example, with respect to FIG. 4 and FIG. 5A. In another example, entropy coding unit 56 may apply a horizontally oriented pattern (e.g., FIG. 6A) or a vertically oriented pattern (e.g., FIG. 7A) to scan the quantized transform coefficients.

During and/or after scanning using the predefined scan order, entropy coding unit 56 may entropy encode the serialized quantized transform coefficients. To entropy encode the transform coefficients entropy coding unit 56 may select a context model to perform CABAC, PIPE, or another context adaptive entropy coding process. Entropy coding unit 56 may select context models based on, for example, the number and/or relative positions of significant coefficients in previously scanned N coefficients, where N is an integer value that may be related to the size of the block being scanned. Entropy coding unit 56 may also select the context model based on a prediction mode used to calculate residual data that was transformed into the block of transform coefficients, and a type of transform used to transform the residual data into the block of transform coefficients. When the corresponding prediction data was predicted using an intra-prediction mode, entropy coding unit 56 may further base the selection of the context model on the direction of the intra-prediction mode.

Entropy coding unit 56 may determine and apply a context support neighborhood when entropy encoding transform coefficients to identify context for determining the appropriate context model. For example, entropy coding unit 56 may select a context model by determining a context for a transform coefficient currently being coded. The context support neighborhood may identify the relative positions of context for entropy coding the transform coefficient. As noted, the context (e.g., the actual values located in the context neighborhood positions) may determine the probability model.

In some examples, entropy coding unit 56 may determine (or be preprogrammed with) a parallel friendly context support neighborhood. For example, according to aspects of this disclosure, entropy coding unit 56 may implement a context support neighborhood that supports parallel calculation of contexts for coding significance flags. That is, entropy coding unit 56 may identify context in positions that allows for parallel calculation of contexts for coding significance flags. In an example, entropy coding unit 56 may initially identify the predefined directional scan path that is being implemented to scan significance information associated with the quantized transform coefficients (e.g., zig-zag, horizontal, vertical, and the like). After identifying the scan path, entropy coding unit 56 may determine whether a context support neighborhood used to entropy code the significance information includes any elements positioned in the scan path.

Relying on such context neighborhood support elements (e.g., elements along the scan path) may impede the ability of the video coder to process significance information in parallel. For example, to calculate significance flag contexts in parallel, all data in the context support neighborhood must be available (e.g., already coded). If the context support neighborhood includes elements along the scan path, a coder may be forced to wait for a context support element in the scan path, which precedes the position currently being coded, to finish coding before coding the significance flag for the current position. This delay reduces the ability of the video coder to calculate significance flag contexts for coefficients on the scan path in parallel.

Accordingly, according to aspects of this disclosure, entropy coding unit 56 may exclude context support neighborhood elements that are located in a path defined by the scan direction (e.g., the "scan path") from being considered during coding. That is, entropy coding unit 56 may not consider significance flags associated with excluded context support neighborhood elements (e.g., positions) when determining context for a current transform coefficient. When no elements of the context support neighborhood included in the scan path, entropy coding unit 56 may calculate significance flag contexts for coefficients along the scan path in parallel. In some examples, entropy coding unit 56 may apply the above referenced schemes (e.g., as described in JCTVC-C227, "Parallelization of HHI Transform Coding," 3rd JCT-VC Meeting, Guangzhou, CN, October 2010, and/or JCTVC-0062, "TE8: TI Parallel Context Processing (PCP) Proposal," 3rd JCT-VC Meeting, Guangzhou, CN, October 2010) to perform parallel calculation of significance flag contexts and encoding of multiple bins.

In another example, rather than apply a predefined scan order and potentially modify the context support neighborhood, entropy coding unit 56 may generate and apply a parallel friendly scan order. That is, entropy coding unit 56 may generate and apply a scan order that enables parallel calculation of contexts for significance information using a number of variables. For example, entropy coding unit 56 may generate the parallel friendly scan order based on a predefined context support neighborhood, a primary priority metric for influencing an orientation of the scan order, a secondary priority metric for further influencing the orientation of the scan order, and a predefined number of parallel threads.

In still another example, entropy coding unit 56 may apply one of a number of stored parallel friendly scan orders, which may be generated using the scan order generation techniques described in this disclosure. That is, video encoder 20 may be preprogrammed with a number of parallel friendly scan orders developed, for example, in a design environment. Entropy coding unit 56 may select and apply a particular parallel friendly scan order based on, for example, another coding metric. That is, entropy coding unit 56 may receive an indication of the selected intra-prediction mode from intra-prediction unit 46 or from transform unit 52, and apply a parallel friendly scan order based on the intra-prediction mode.

In examples in which a particular parallel friendly scan order is generated based on, for example, a predefined context support neighborhood, a primary priority metric, a secondary priority metric, and a number of desired parallel threads, entropy coding unit 56 may implement the context support neighborhood used to generate the parallel friendly scan order. That is, entropy coding unit 56 may apply the context support neighborhood used to generate the parallel friendly scan order to entropy encode syntax elements (e.g., significance information) in parallel. In some examples, as noted above, entropy coding unit 56 may apply the above referenced schemes (e.g., as described in JCTVC-C227, "Parallelization of HHI Transform Coding," 3rd JCT-VC Meeting, Guangzhou, CN, October 2010, and/or JCTVC-0062, "TE8: TI Parallel Context Processing (PCP) Proposal," 3rd JCT-VC Meeting, Guangzhou, CN, October 2010) to perform parallel calculation of significance flag contexts and encoding of multiple bins.

In some cases, entropy coding unit 56 or another unit of video encoder 20 may be configured to perform other coding functions, in addition to entropy coding. For example, entropy coding unit 56 may be configured to determine CBP values for the macroblocks and partitions. Also, in some cases, entropy coding unit 56 may perform run length coding of the coefficients in a macroblock or partition thereof.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

Figure 3:
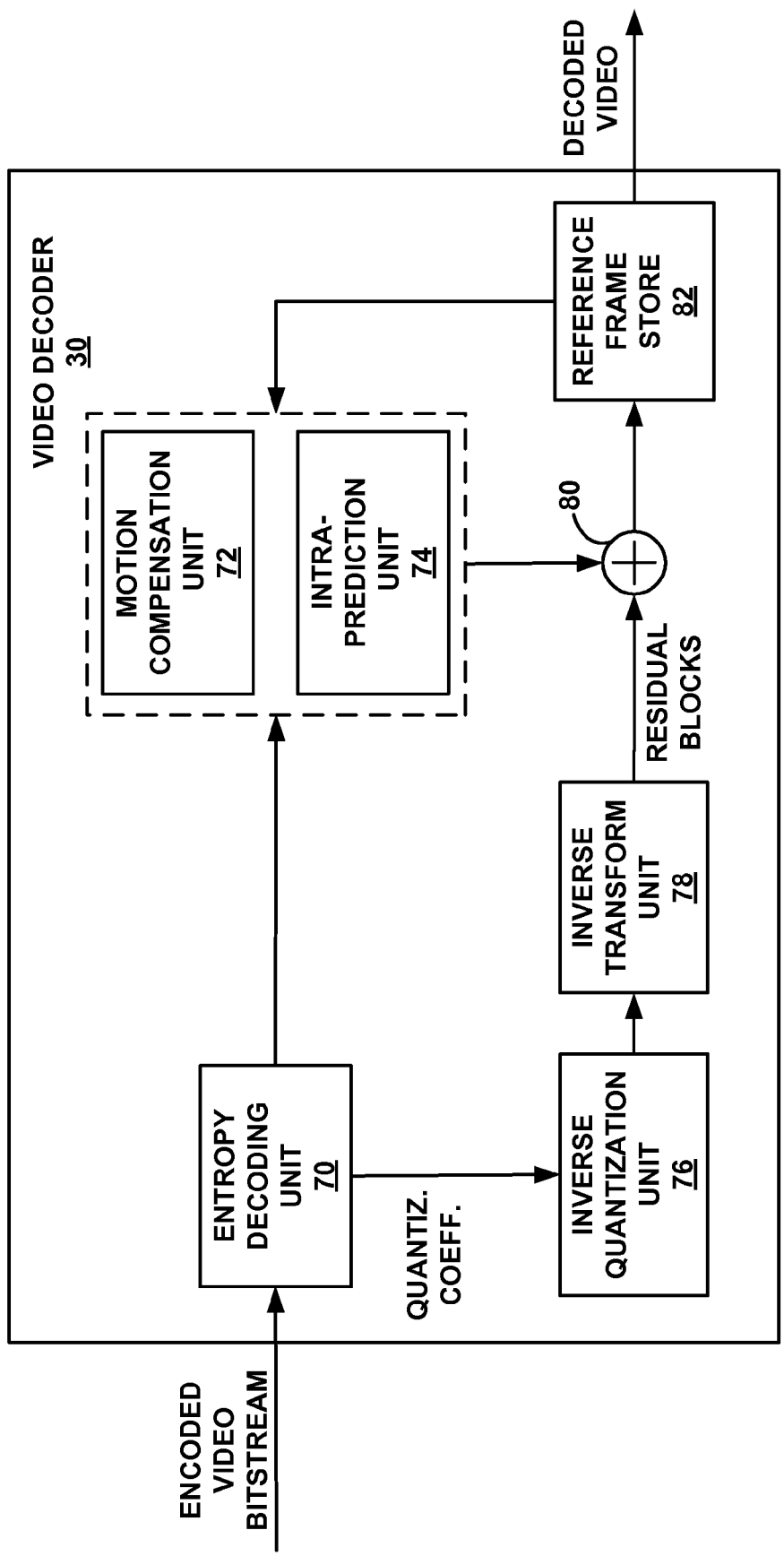
FIG. 3 is a block diagram illustrating an example of video decoder that may implement any or all of the techniques for efficiently scanning and entropy coding significance information in parallel described in this disclosure.

FIG. 3 is a block diagram illustrating an example of video decoder 30, which decodes an encoded video sequence. Video decoder 30 that may implement any or all of the techniques for efficiently scanning and entropy coding significance information described in this disclosure.

In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70. Intra-prediction unit 74 may generate prediction data for a current block of a current frame based on a signaled intra-prediction mode and data from previously decoded blocks of the current frame.

In some examples, entropy decoding unit 70 or inverse quantization unit 76 may scan the received values using a scan mirroring that used by video encoder 20. In the example of FIG. 3, video decoder 30 may be configured to apply a predetermined directional scan order (e.g., symmetrical to the predetermined scan order applied by video encoder 20), to apply a scan order signaled by video encoder 20, or to use the same process described with respect to video encoder 20 to identify an appropriate scan order from a number of stored scan orders.

According to aspects of this disclosure, video decoder 30 may be configured to scan and entropy decode significance information associated with a block of quantized transform coefficients in parallel. That is, entropy decoding unit 70 may generate and apply a parallel friendly scan order that is symmetrical to the parallel friendly scan order generated by video encoder 20. For example, entropy decoding unit 70 may generate and apply a scan order, which enables calculation of multiple significance flag contexts in parallel, using a number of variables including, for example, a predefined context support neighborhood, a primary priority metric for influencing an orientation of the scan order, a secondary priority metric for further influencing the orientation of the scan order, and a predefined number of parallel threads.

In still another example, entropy decoding unit 70 may apply one of a number of stored parallel friendly scan orders, which may be generated using the scan order generation techniques described in this disclosure (e.g., such as those described with respect to video encoder 20 shown in FIG. 2). That is, video decoder 30 may be preprogrammed with a number of parallel friendly scan orders developed, for example, in a design environment. Entropy decoding unit 70 may select and apply a particular parallel friendly scan order based on, for example, another coding metric, such as a prediction mode used or transform used to encode the received bitstream.

According to aspects of this disclosure, entropy decoding unit 70 may be configured to identify and apply a context support neighborhood in the same manner as that described with respect to video encoder 20 above. That is, for example, entropy decoding unit 70 may determine and apply a context support neighborhood when entropy decoding transform coefficients to identify context for determining an appropriate context model. For example, entropy decoding unit 70 may select a context model by determining a context for a transform coefficient currently being coded. The context support neighborhood may identify the relative positions of context for entropy coding the transform coefficient. As noted, the context (e.g., the actual values located in the context neighborhood positions) may determine the probability model.

In some examples, entropy decoding unit 70 may determine (or be preprogrammed with) a parallel friendly context support neighborhood. Entropy decoding unit 70 may implement a context support neighborhood that supports parallel calculation of contexts for coding significance flags. In an example, entropy decoding unit 70 may determine whether a context support neighborhood includes any elements positioned in the scan path, and may exclude context support neighborhood elements that are located in the scan path from being considered during coding. That is, entropy decoding unit 70 may not consider significance flags associated with excluded context support neighborhood elements (e.g., positions) when determining context for a current transform coefficient. When no elements of the context support neighborhood are included in the scan path, entropy decoding unit 70 may calculate contexts for decoding all significance flags along the scan path in parallel.

Inverse quantization unit 76 inverse quantizes, i.e., de-quantizes, the quantized transform coefficients provided in the bitstream and decoded by entropy decoding unit 70. The inverse quantization process may include a conventional process, e.g., as defined by the H.264 decoding standard or by HEVC. The inverse quantization process may include use of a quantization parameter QP calculated by video encoder 20 for the CU to determine a degree of quantization and, likewise, a degree of inverse quantization that should be applied.

Inverse transform unit 58 applies an inverse transform, e.g., an inverse DCT, an inverse integer transform, an inverse rotational transform, or an inverse directional transform. In some examples, inverse transform unit 78 may determine an inverse transform based on an intra-prediction mode signaled for a received intra-prediction encoded block. If the block is of a size for which more than one transform is possible, based on the intra-prediction mode, then inverse transform unit 78 may determine a transform to apply to the current block based on a signaled transform at the root node of a quadtree for an LCU including the current block. In some examples, inverse transform unit 78 may apply a cascaded inverse transform, e.g., first an inverse rotational transform followed by an inverse directional transform.

Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 and intra-prediction unit 74 use some of the syntax information (e.g., provided by a quadtree) to determine sizes of LCUs used to encode frame(s) of the encoded video sequence, split information that describes how each CU of a frame of the encoded video sequence is split (and likewise, how sub-CUs are split), modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

Figure 4:
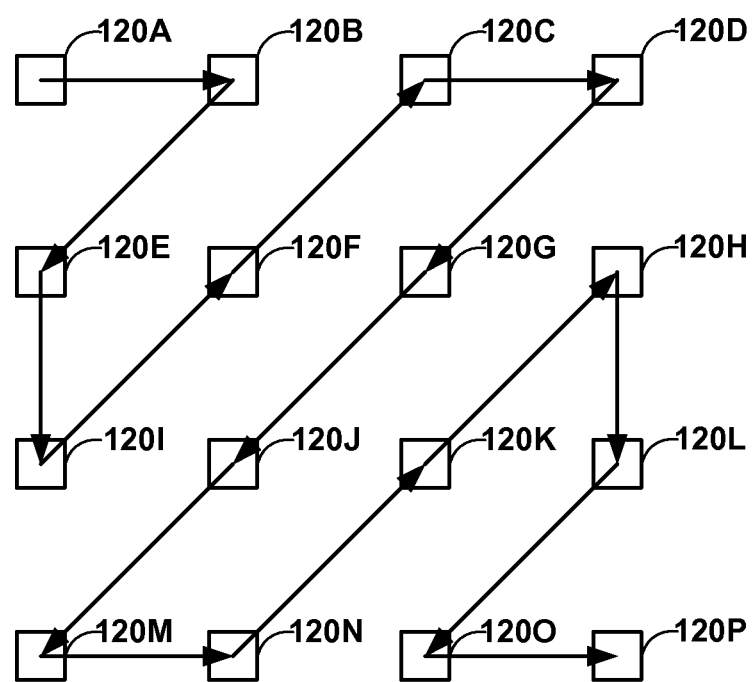
FIG. 4 is a conceptual diagram illustrating an example zig-zag scan of transform coefficient positions, according to aspects of the disclosure.

FIG. 4 is a conceptual diagram illustrating an example zig-zag scan of transform coefficient positions 120A-120P (transform coefficient positions 120). Video encoder 20 may be configured to scan a block of coefficients using the zig-zag scan of FIG. 4 following, e.g., application of a DCT to a residual block. In addition, video encoder 20 may also be configured to scan a block of related syntax elements, such as significance information, in the same manner. That is, in one example, video encoder 20 may be configured to scan a block of significance information according to the zig-zag scan of FIG. 4, and may be configured to scan the coefficient levels in the same or reverse order.

In the example shown in FIG. 4, the zig-zag scan starts at transform coefficient position 120A, then proceeds to transform coefficient position 120B, then to transform coefficient position 120E, then to transform coefficient position 120I, then to transform coefficient position 120F, then to transform coefficient position 120C, then to transform coefficient position 120D, then to transform coefficient position 120G, then to transform coefficient position 120J, then to transform coefficient position 120M, then to transform coefficient position 120N, then to transform coefficient position 120K, then to transform coefficient position 120H, then to transform coefficient position 120L, then to transform coefficient position 120O, and finally to transform coefficient position 120P. Similarly a top-right to bottom-left diagonal scan travels the transform coefficient positions in the order 120A, 120B, 120E, 120C, 120F, 120I, 120D, 120G, 120J, 120M, 120H, 120K, 120N, 120L, 120O, and 120P. A bottom-left to top-right diagonal scan travels the transform coefficient positions in the order 120A, 120E, 120B, 120I, 120F, 120C, 120M, 120J, 120G, 120D, 120N, 120K, 120H, 120O, 120L, and 120P.

By performing a zig-zag scan, the two-dimensional arrangement of transform coefficients may be converted into a one-dimensional array including values for each of transform coefficient positions 120. These values may be arranged in the array in the order of the scan. For example, the value for transform coefficient position 120A may be first in the array, followed by values for transform coefficient positions 120B, 120E, 120I, 120F, and so on.

The zig-zag scan of FIG. 4 may be associated with a DCT applied to a residual block to form transform coefficients. In general, the DCT compacts the energy of pixels associated with transform coefficient positions 120 into the upper-left corner of the transformed block. Accordingly, the lowest frequency coefficients may generally occur close to the upper-left corner following the DCT, while the highest frequency coefficients may generally occur close to the bottom-right corner following the DCT. Accordingly, the zig-zag scan may be configured to attempt to ensure that lower frequency coefficients are placed earlier in the array than higher frequency coefficients. In this manner, a video encoder may compress data by zeroing out coefficients later in the array, which should correspond to higher frequency coefficients.

Other predefined scan patterns may also be defined for other transforms. For example, each transform may be associated with a scan pattern that is designed to place higher magnitude coefficients resulting from the transform earlier in an array than lower magnitude coefficients. One of the transforms may cause higher magnitude coefficients to occur along the far left column of a block of transform coefficients (e.g., vertically oriented), in which case a corresponding scan may be defined that starts at transform coefficient position 120A, then proceeds to transform coefficient position 120E, then to transform coefficient position 120I, then to transform coefficient position 120M, then to transform coefficient position 120B, and so on. As another example, another one of the directional transforms may cause higher magnitude coefficients to occur along the top row of a block of transform coefficients (e.g., horizontally oriented), in which case a corresponding scan may be defined that starts at transform coefficient position 120A, then proceeds to transform coefficient position 120B, then to transform coefficient position 120C, then to transform coefficient position 120D, then to transform coefficient position 120E, and so on.

Techniques of this disclosure relate generally to efficiently scanning and entropy coding significance information. For the zig-zag scan pattern shown in FIG. 4, aspects of the disclosure include applying a context support neighborhood during entropy coding that does not include any context elements along the scan path. That is, for example, when entropy coding significance information associated with the transform coefficients related to transform coefficient position 120G, the context support neighborhood would not include context elements in positions 120D, 120J, or 120M.

Relying on such context neighborhood support elements may impede the ability of a video coder to calculate contexts for multiple significance flags in parallel. For example, to calculate context for position 120G, all data in the context support neighborhood must be available (e.g., already coded). If the context support neighborhood includes elements along the scan path, such as context elements in positions 120D, 120J, or 120M, a coder may be forced to wait for such context support elements to finish coding calculating the context for significance flag for position 120G. This delay reduces the ability of the video coder to calculate significance flag contexts in parallel.

Accordingly, aspects of this disclosure relate to optimizing the context support neighborhood for parallel calculation of contexts for coding significance flags by excluding context support neighborhood elements that are located in a path defined by the scan direction (e.g., the "scan path") from being considered during coding. In the example shown in FIG. 4, when no elements of the context support neighborhood are included in the diagonal scan path, an entropy coder can code all of the significance information along the diagonal scan path in parallel.

While certain aspects of FIG. 4 were described with respect to video encoder 20, it should be understood that the described techniques may also be applied by a video decoder, such as video decoder 30.

FIG. 5A-FIG. 7C are conceptual diagrams illustrating example scan patterns and corresponding parallel friendly context support neighborhoods, according to aspects of this disclosure. It should be understood that the scan patterns and context support neighborhoods shown in FIGS. 5A-7 are provided as non-limiting examples, and that other scan patterns and context support neighborhoods may exhibit the aspects related to parallel calculation of contexts described herein.

Figure 5A:
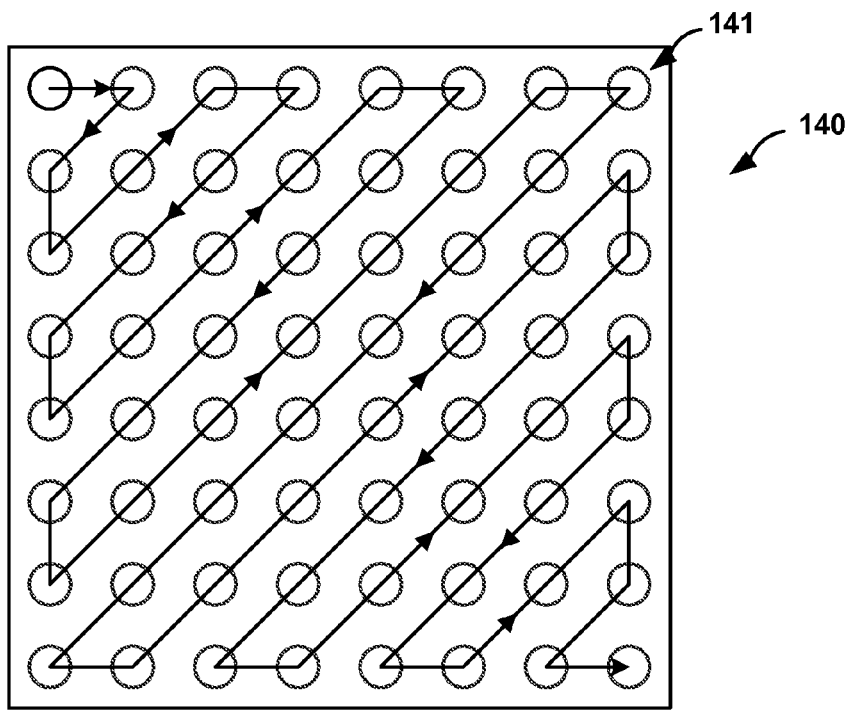
FIG. 5A is a conceptual diagram illustrating zig-zag scan pattern for scanning quantized transform coefficients.

FIG. 5A is a conceptual diagram illustrating a diagonal, or zig-zag scan pattern 140 for scanning quantized transform coefficients. For example, FIG. 5A includes a number of circles 141 that may represent transform coefficient positions in a block of video data, with each transform coefficient position having a corresponding quantized transform coefficient. As shown in FIG. 5A, the transform coefficients are generally scanned in a diagonal, or zig-zag pattern. That is, the transform coefficients of the two-dimensional block shown in FIG. 5A is serialized to a one-dimensional array by scanning the transform coefficients from the relative upper-left of the block to the relative lower-right of the block, and from the relative lower-right of the block to the relative upper-left of the block. As noted above, in some examples, significance information associated with the transform coefficients may be scanned prior to the level information associated with the transform coefficients. In addition, significance information may be scanned in the same or opposite order as the quantized transform coefficient levels.

It should be understood that the zig-zag scan shown in FIG. 5A is provided merely as an example, and other diagonally oriented scans may be used to scan transform coefficients. For example, in another example, the scan paths of a diagonally oriented scan may all follow the same relative direction. That is, all scan paths may follow a path that is diagonally oriented from the top-right corner of the block to bottom-left corner of the block. In another example, all scan paths may follow a path that is diagonally oriented from the bottom-left corner of the block to the top-right corner of the block.

Figure 5B:
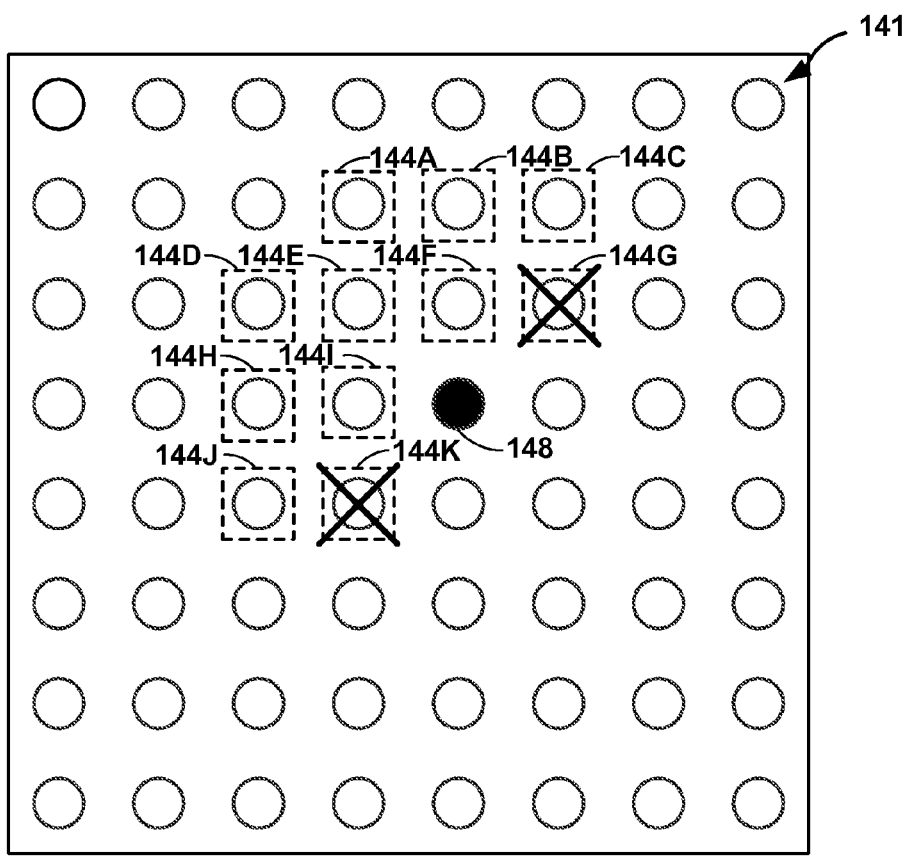
FIG. 5B is a conceptual diagram of a parallel friendly context support neighborhood that may be used during entropy coding of quantized transform coefficients using the scan of FIG. 5A.

FIG. 5B is an example of a parallel friendly context support neighborhood that is indicated by dashed boxes 144A-144K (collectively, context support neighborhood elements 144) that may be used during entropy coding of quantized transform coefficients using the diagonal scan of FIG. 5A. For example, the context support neighborhood shown in FIG. 5B originally includes 11 potential context support elements 144 that neighbor transform coefficient position 148 (e.g., which includes a transform coefficient having associated significance information, level information, sign information, and the like) currently being entropy coded. As noted above, the context support elements 144 may identify context for determining an appropriate context model. For example, an entropy coding unit (e.g., such as entropy coding unit 56 or entropy decoding unit 70) may select a context model by determining a context for a transform coefficient currently being coded. The context support neighborhood may identify the relative positions of context (e.g., the actual values located in the positions) for entropy coding the transform coefficient in the position currently being coded 148.

While the context support neighborhood of FIG. 5B includes 11 potential context support elements 144, it should be understood that the context support neighborhood may contain any number of elements in a variety of configurations. In an example, as described with respect to FIG. 5C, the context support neighborhood may contain five context support elements that neighbor position currently being coded. Other configurations are also possible.

According to the techniques described in this disclosure, context support elements 144G and 144K in the context support neighborhood 144 have been excluded (represented as being crossed out with an "X") in order to make the context support neighborhood parallel friendly. That is, context support elements 144G and 144K of the context support neighborhood 144, which are positioned along the zig-zag scan path defined in FIG. 5A have been excluded from being considered during coding. For example, if the zig-zag scan pattern shown in FIG. 5A is overlaid with the context support neighborhood 144 shown in FIG. 5B, the context support elements 144G and 144K of the context support neighborhood 144, which are positioned along the diagonally oriented scan path, have been excluded. Thus, the significance information associated with the excluded context support neighborhood elements (e.g., positions) will not be considered when determining context for the current transform coefficient position 148.

By excluding the context elements from the scan path, an entropy coder can calculate significance flag contexts for all the positions along the scan path in parallel. For example, after finishing coding of significance flags associated with context support elements 144J, 144I, 144F, and 144C, the significance flag contexts for the next scan path, which includes current transform coefficient position 148 can be calculated in parallel.

Figure 5C:
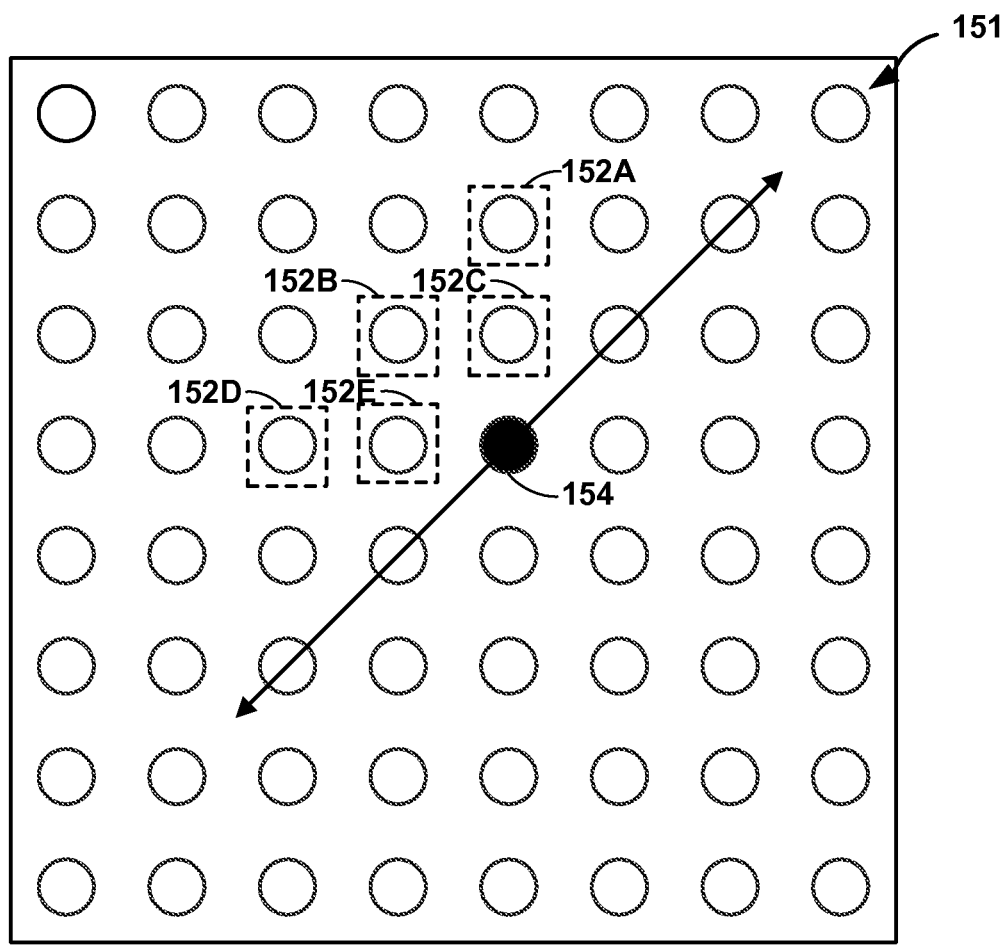
FIG. 5C is a conceptual diagram of another parallel friendly context support neighborhood that may be used during entropy coding of quantized transform coefficients using the scan of FIG. 5A.

FIG. 5C is a conceptual diagram illustrating an example of a parallel friendly context support neighborhood for a diagonally oriented scan path. For example, FIG. 5C includes a number of circles 151 that may represent transform coefficient positions in a block of video data, with each transform coefficient position having a corresponding quantized transform coefficient. As indicated by the diagonal line passing through a transform coefficient position currently being coded 154, the scan path shown in FIG. 5C is diagonally oriented.

In addition, the example of FIG. 5C shows a parallel friendly context support neighborhood 152A-152E (collectively, context support neighborhood 152) having five elements. That is, context support neighborhood 152 includes a first position 152C adjacent to and above the current transform coefficient position 154, a second position 154A adjacent to and above the first position 152C, a third position 152E adjacent to and left of the current transform coefficient position 154, a fourth position 152D adjacent to and left of the third position, and a fifth position 152B adjacent to and above the third position 152E and adjacent to and left of the first position 152C.

As noted above, by excluding the context elements from the scan path, an entropy coder can calculate significance flag contexts for all the positions along the scan path in parallel.

Figure 6A:
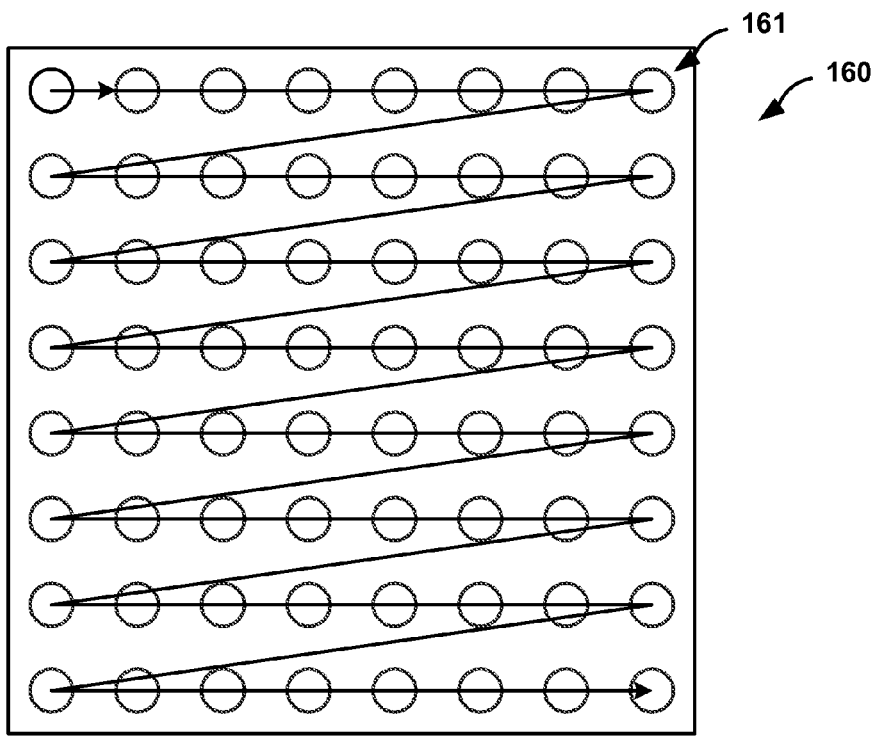
FIG. 6A is a conceptual diagram illustrating horizontal scan pattern for scanning quantized transform coefficients.

FIG. 6A is a conceptual diagram illustrating a horizontal scan pattern 160 for scanning quantized transform coefficients. For example, FIG. 6A includes a number of circles 161 that may represent transform coefficient positions in a block of video data, with each transform coefficient position having a corresponding quantized transform coefficient. As shown in FIG. 6A, the transform coefficients are generally scanned in a horizontal pattern. That is, the transform coefficients and of the two-dimensional block shown in FIG. 6A is serialized to a one-dimensional array by scanning the transform coefficients from left to right across each row of the block, from top to bottom.

Figure 6B:
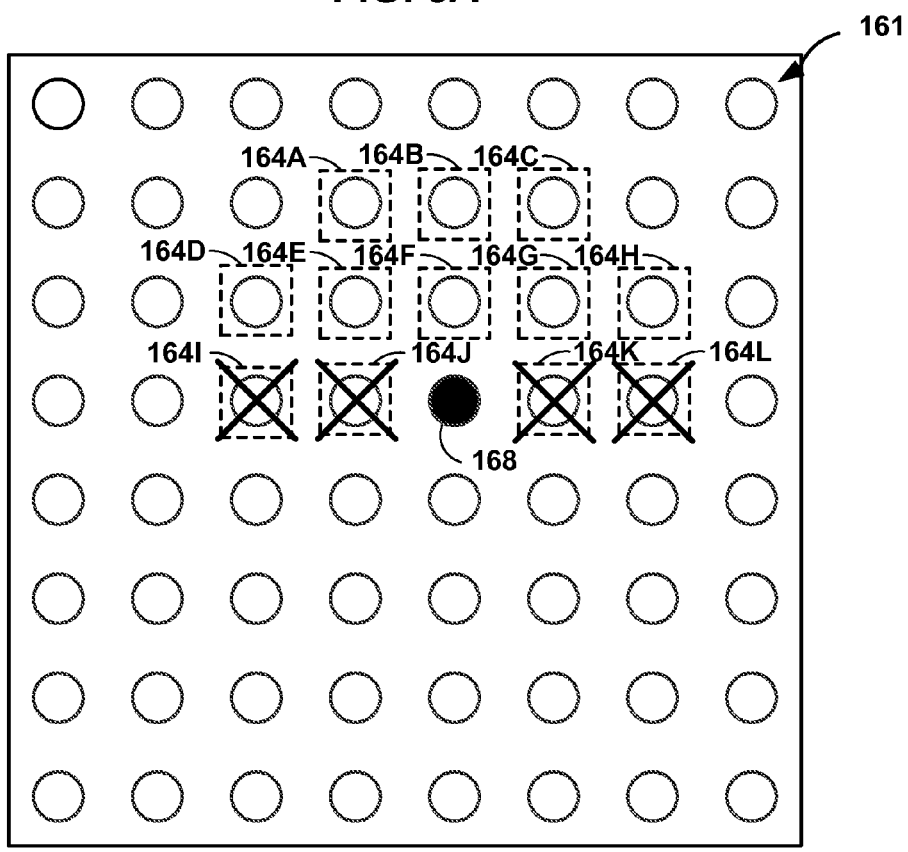
FIG. 6B is a conceptual diagram of a parallel friendly context support neighborhood that may be used during entropy coding of quantized transform coefficients using the scan of FIG. 6A.

FIG. 6B is an example of a parallel friendly context support neighborhood that is indicated by dashed boxes 164A-164L (collectively, context support neighborhood elements 164) that may be used during entropy coding of quantized transform coefficients using the horizontal scan of FIG. 6A. For example, the context support neighborhood shown in FIG. 6B originally includes 11 potential context support elements 164 that neighbor transform coefficient position 168 currently being entropy coded. As noted above, the context support elements 164 may identify context for determining an appropriate context model. For example, an entropy coding unit (e.g., such as entropy coding unit 56 or entropy decoding unit 70) may select a context model by determining a context for a transform coefficient currently being coded. The context support neighborhood may identify the relative positions of context (e.g., the actual values located in the positions) for entropy coding the transform coefficient in the position currently being coded 168.

As shown in FIG. 6B, according to the techniques described in this disclosure, context support elements 164I, 164J, 164K, and 164L in the context support neighborhood 164 have been excluded (represented as being crossed out with an "X") in order to make the context support neighborhood parallel friendly. That is, for example, context support elements 164I, 164J, 164K, and 164L of the context support neighborhood 164, which are positioned along the scan path defined by FIG. 6A have been excluded. Thus, the significance information associated with the excluded context support neighborhood elements (e.g., positions) will not be considered when determining context for the current transform coefficient position 168.

As described above with respect to FIG. 5B, by excluding the context elements from the scan path, the significance flag contexts along a scan path can be calculated in parallel. That is, significance flag context for transform coefficient position 168 may be calculated in parallel with all the other significance flag contexts on the same scan path as transform coefficient position 168.

Figure 7A:
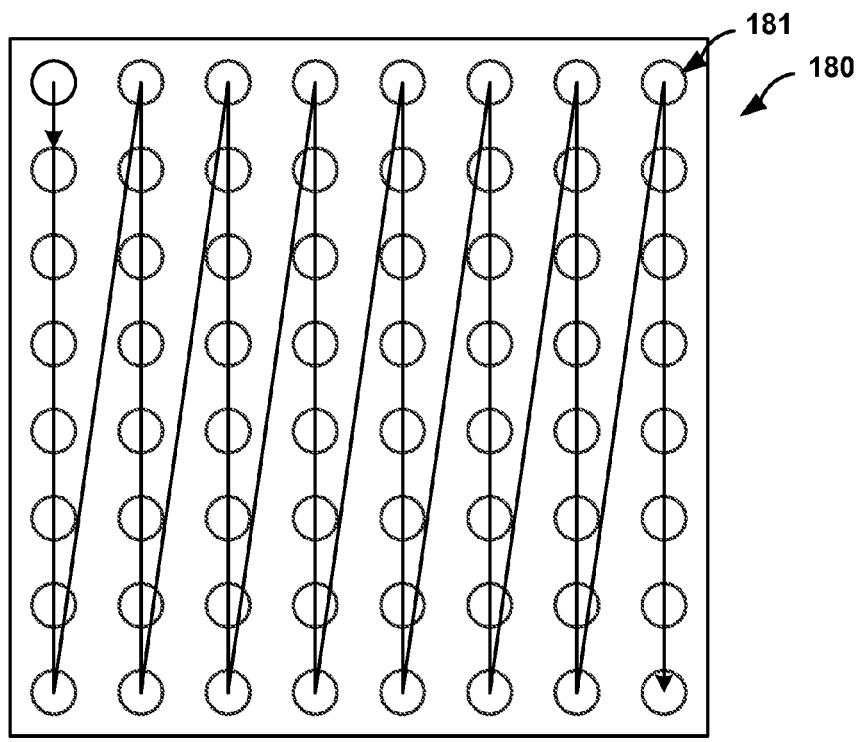
FIG. 7A is a conceptual diagram illustrating vertical scan pattern for scanning quantized transform coefficients.

FIG. 7A is a conceptual diagram illustrating a vertical scan pattern 180 for scanning quantized transform coefficients. For example, FIG. 7A includes a number of circles 181 that may represent transform coefficient positions in a block of video data, with each transform coefficient position having a corresponding quantized transform coefficient. As shown in FIG. 7A, the transform coefficients are generally scanned in a vertical pattern. That is, the transform coefficients of the two-dimensional block shown in FIG. 7A is serialized to a one-dimensional array by scanning the transform coefficients from top to bottom in each column, from left to right across the block.

Figure 7B:
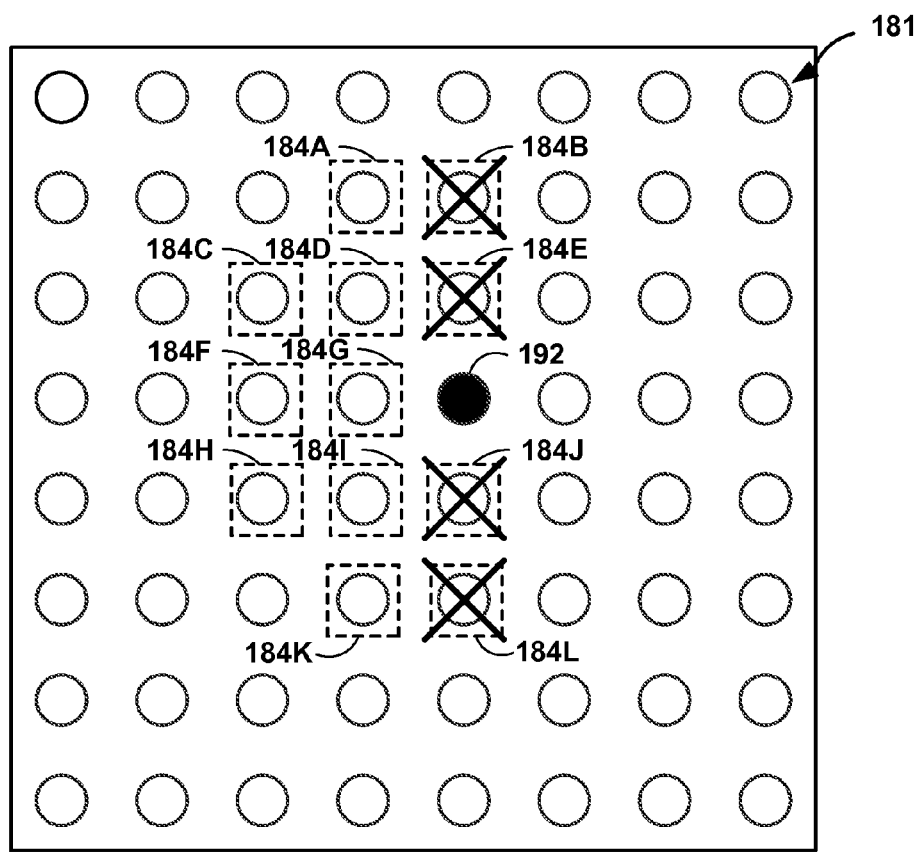
FIG. 7B is a conceptual diagram of a parallel friendly context support neighborhood that may be used during entropy coding of quantized transform coefficients using the scan of FIG. 7A.

FIG. 7B is an example of a parallel friendly context support neighborhood that is indicated by dashed boxes 184A-184L (collectively, context support elements 184) that may be used during entropy coding of quantized transform coefficients using the vertical scan of FIG. 7A. For example, the context support neighborhood shown in FIG. 7B originally includes 11 potential context support elements 184 that neighbor transform coefficient position 192 currently being entropy coded. As noted above, the context support elements 184 may identify context for determining an appropriate context model. For example, an entropy coding unit (e.g., such as entropy coding unit 56 or entropy decoding unit 70) may select a context model by determining a context for a transform coefficient currently being coded. The context support neighborhood may identify the relative positions of context (e.g., the actual values located in the positions) for entropy coding the transform coefficient in the position currently being coded 184.

As shown in FIG. 6B, according to the techniques described in this disclosure, context support elements 184B, 184E, 184J, and 184L in the context support neighborhood 184 have been excluded (represented as being crossed out with an "X") in order to make the context support neighborhood parallel friendly. That is, for example, context support elements 184B, 184E, 184J, and 184L of the context support neighborhood 184, which are positioned along the scan path defined by FIG. 7A, have been excluded. Thus, the significance information associated with the excluded context support neighborhood elements (e.g., positions) will not be considered when determining context for the current transform coefficient position 188.

As described above with respect to FIGS. 5B and 6B, by excluding the context elements from the scan path, the significance flag contexts along a scan path can be calculated in parallel. That is, significance flag context associated with transform coefficient position 188 may be calculated in parallel with all other significance flag contexts positioned on the same scan path as transform coefficient position 188.

Figure 7C:
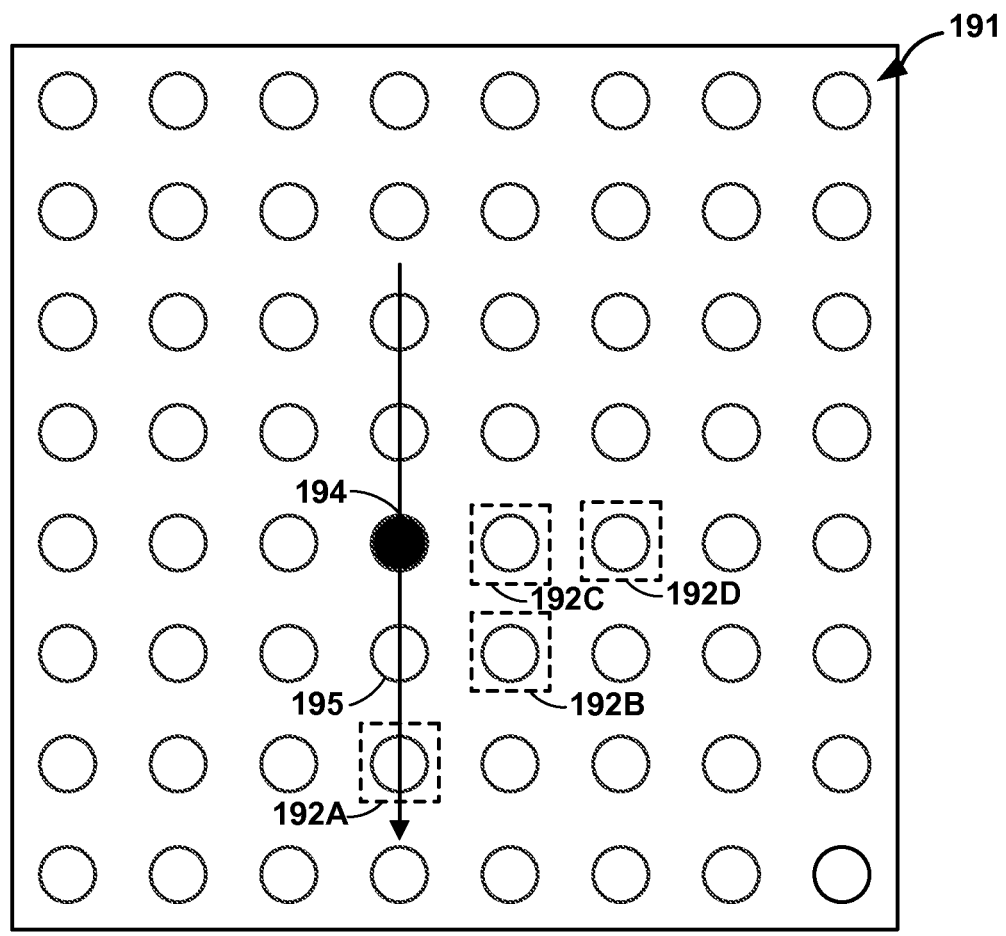
FIG. 7C is a conceptual diagram of another parallel friendly context support neighborhood that may be used during entropy coding of quantized transform coefficients using the scan of FIG. 7A.

FIG. 7C is a conceptual diagram illustrating an example of a parallel friendly context support neighborhood for a vertically oriented scan path, such as the scan path shown in FIG. 7A. For example, FIG. 7C includes a number of circles 191 that may represent transform coefficient positions in a block of video data, with each transform coefficient position having a corresponding quantized transform coefficient. As indicated by the vertical line passing through a transform coefficient position currently being coded 194, the scan path shown in FIG. 7C is vertically oriented.

The example of FIG. 7C shows a parallel friendly context support neighborhood 192A-192D (collectively, context support neighborhood 192) having four elements. As shown in FIG. 7C, according to some aspects of this disclosure, not all of the context support neighborhood elements of a particular scan path need to be excluded for the context support neighborhood to be considered. That is, for example, while the context support neighborhood shown in FIG. 7C includes context support element 192A in the scan path, transform coefficient 195 is positioned adjacent to (and in the scan path of) the transform coefficient currently being coded 194 has been excluded from the context support neighborhood. In this example, transform coefficient 195 is scanned immediately prior to the transform coefficient currently being coded 194. Accordingly, in the example of FIG. 7C, an entropy coder can calculate significance flag contexts for two positions in parallel. That is, the entropy coder can calculate significance flag contexts for the transform coefficient currently being coded 194 and the transform coefficient 195 positioned adjacent to the transform coefficient currently being coded 194 (in the scan path) in parallel.

In other examples, another number of context support elements positioned in the scan path can be excluded from context support neighborhood to produce a parallel friendly scan (e.g., three, four, and the like). In this way, the techniques of this disclosure include excluding one or more context support neighborhood elements that are scanned prior to a current position from a scan path.

While certain aspects described with respect to FIGS. 5A-7B refer to "excluding" elements from a context support neighborhood, it should be understood that the exclusion of context support neighborhood elements may be performed during an initial configuration of a video coder or in real time during coding. That is, "excluding" generally refers to not considering an element in a context support neighborhood during coding. In one example, a video coder may be programmed (e.g., in a design environment) to implement a context support neighborhood that "excludes," or does not include context support elements along a predetermined scan path. In another example, a video coder may alter the context support neighborhood "on the fly" during coding so as to "exclude," or not include context support elements along a scan path. In this example, both a video encoder and video decoder may be configured to implement the same context support alteration process.

Figure 8:
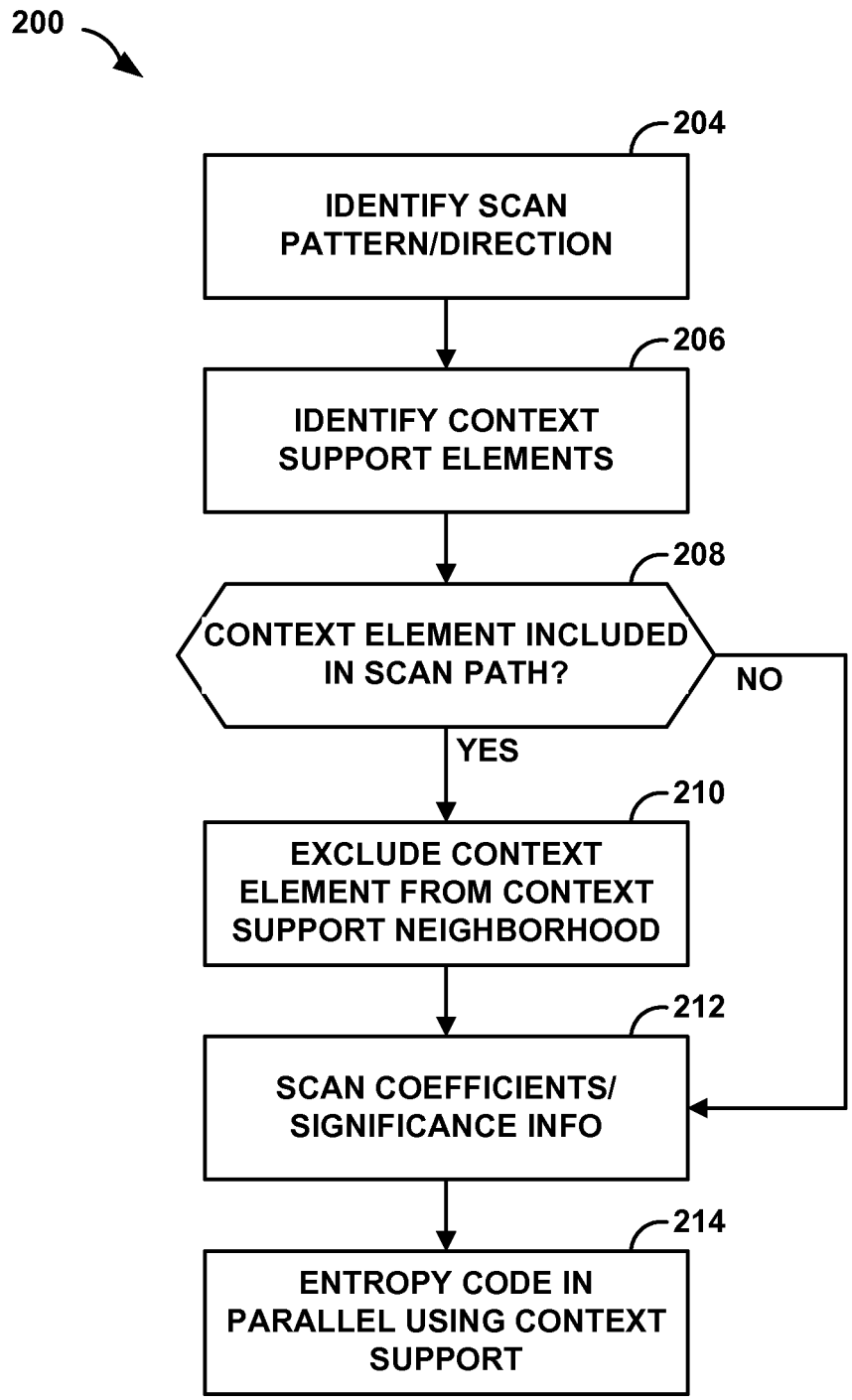
FIG. 8 is a flow chart illustrating an example method of determining a parallel friendly context support neighborhood for a particular scan pattern, according to aspects of the disclosure.

FIG. 8 is a flow chart illustrating an example method 200 of determining a parallel friendly context support neighborhood for a particular scan pattern. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 8.

Video encoder 20 initially identifies a scan pattern (or scan direction) that may be used to serialize quantized transform coefficients from a two-dimensional block to a one-dimensional array (204). For example, video encoder 20 may identify the scan pattern as being a diagonal scan, such as the zig-zag scan shown in FIG. 5A, the horizontal scan shown in FIG. 6A, or the vertical scan shown in FIG. 7A.

After identifying the scan, video encoder 20 may identify the context support elements of the context support neighborhood used to entropy code the quantized transform coefficients (206). In general, the context support neighborhood identifies the context for entropy coding a particular symbol or flag. In one example, the context support neighborhood may identify five neighboring locations that define the context (see, for example, the context support neighborhood shown in FIG. 5C), although any number of neighbors can be used.

Video encoder 20 then determines whether any elements of the context support neighborhood are included in the identified scan path (208). If context elements of the context support neighborhood are included in the scan path, video encoder 20 excludes such context elements from the context support neighborhood (210) before scanning the transform coefficients (212). If context elements of the context support neighborhood are not included in the scan path (e.g., the "no" path of step 208), video encoder 20 can proceed directly to scanning the transform coefficients (212).

According to aspects of this disclosure, video encoder 20 may then calculate significance flag contexts along a scan path in parallel, using the context support neighborhood defined in method 200. For example, by excluding context support elements from the context support neighborhood that are positioned along the scan path, video encoder 20 creates a parallel friendly context support neighborhood. Accordingly, as described with respect to FIGS. 5B, 6B, and 7B, video encoder may calculate significance flag contexts along a given scan path in parallel.

It should also be understood that the steps shown and described with respect to FIG. 8 are provided as merely one example. For example, the context neighborhood produced by method 200 may be generated in a design environment and stored in a video encoder or video decoder. Accordingly, the steps of method 200 may not be performed "on the fly" during video coding. Moreover, the steps of the method 200 of FIG. 8 need not necessarily be performed in the order shown in FIG. 8, and fewer, additional, or alternative steps may be performed.

Figure 9:
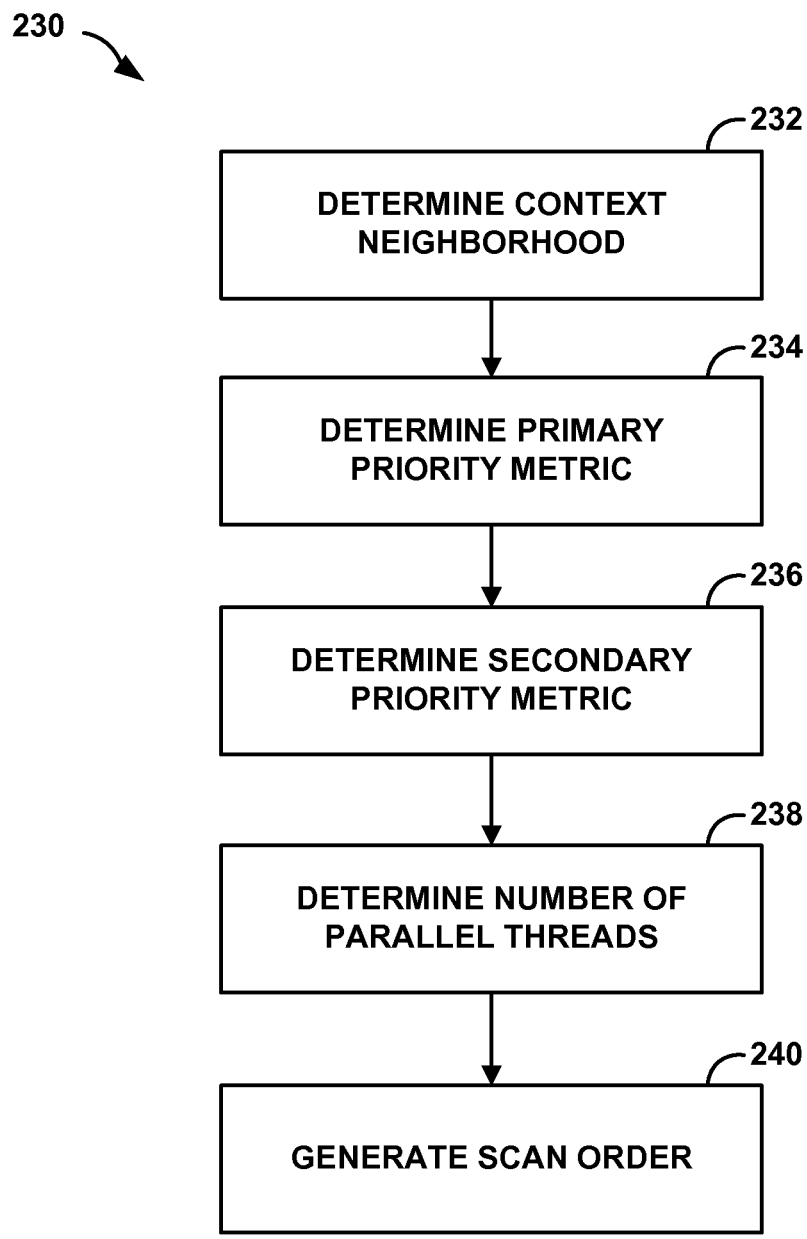
FIG. 9 is a flow chart illustrating an example method of generating a parallel friendly scan order, according to aspects of the disclosure.

FIG. 9 is a flow chart illustrating an example method of generating a parallel friendly scan order. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 9.

In general, aspects of the method 230 relate to generating a scan order for calculating multiple significance flag contexts in parallel. According to some examples, method 230 may be used to develop a scan order that enables efficient parallel context-adaptive binary arithmetic coding (CABAC) of significance information (e.g., significance flags). In the example shown in FIG. 9, video encoder 20 generates a scan order based on a predefined context support neighborhood, a primary priority metric for influencing an orientation of the scan order, a secondary priority metric for further influencing the orientation of the scan order, and a predefined number of parallel threads (e.g., a desired number of significance flag contexts that are to be calculated simultaneously). Video encoder 20 begins by determining a context support neighborhood (232). The context support neighborhood may identify the relative positions of the context elements with respect to a significance flag currently being coded. In some examples, the context support neighborhood may be predefined. That is, the context support neighborhood may be a fixed parameter in video encoder 20. In an example, the context support neighborhood for a diagonally oriented scan may be fixed according to the example shown in FIG. 5C.

After determining the context support neighborhood, video encoder 20 may determine a primary priority metric (234). As described in greater detail with respect to FIGS. 10A-13B, the primary priority metric may be designed to influence the orientation of the generated scan order. For example, the primary priority metric may include a function that is applied during the scan order generation process that influences the orientation of the generated scan order. That is, in an example, the primary priority metric may be a function that favors scanning significance information along a row of transform coefficients over significance information along a column of transform coefficients.

Next, video encoder 20 may determine a secondary priority metric (236). Similar to the primary priority metric, the secondary priority metric may include another function that is also applied during the scan order generation process that may further influence the orientation of the generated scan. In some examples, the secondary priority metric may be applied as a tiebreaker. That is, if the primary priority metric indicates that two significance flags have equal priority (e.g., according to the primary priority metric), the secondary priority metric may be applied to resolve such ties.

Video encoder 20 may determine a number of desired parallel threads (238). In some examples, the number of parallel threads input to the scan order generation process may be used to influence an amount of parallelism that the generated scan order can support. For example, the number of parallel threads input may be a predefined constant (e.g., two, three, four, and the like), that influences the amount of parallelism that the generated scan can support. That is, a number of parallel threads input of two may produce a scan order that allows two significance flag contexts to be calculated in parallel. Similarly, a number of parallel threads input of three may produce a scan order that allows three significance flag contexts to be calculated in parallel, and so on.

Video encoder 20 then generates a scan order based on the variables set forth in steps 232-238 (240). According to some aspects of the disclosure, varying one or more of the elements used to develop the parallel friendly scan order (e.g., the context support neighborhood, the primary priority metric, the secondary priority metric, and the desired number of parallel threads) may change the orientation of the resulting scan order. For example, altering the primary priority metric and/or secondary priority metric may change the orientation of the resulting scan order. That is, given a particular context support neighborhood, varying the primary priority metric and/or secondary priority metric may generate a horizontal, vertical, or diagonally oriented scan.

While described as being carried out by video encoder 20, it should be understood that method 230 may be carried out by a variety of other devices. That is, for example, method 230 may be carried out by a video decoder, such as video decoder 30. In another example, method 230 may be carried out by a developer in a design environment. That is, a developer may vary the variables set forth in steps 232-238 to generate parallel friendly scans having different orientations. The developer may then store the developed scans in video encoder 20 and/or video decoder 30. In addition, the steps of the method of FIG. 9 need not necessarily be performed in the order shown in FIG. 9, and fewer, additional, or alternative steps may be performed.

Figure 10A:
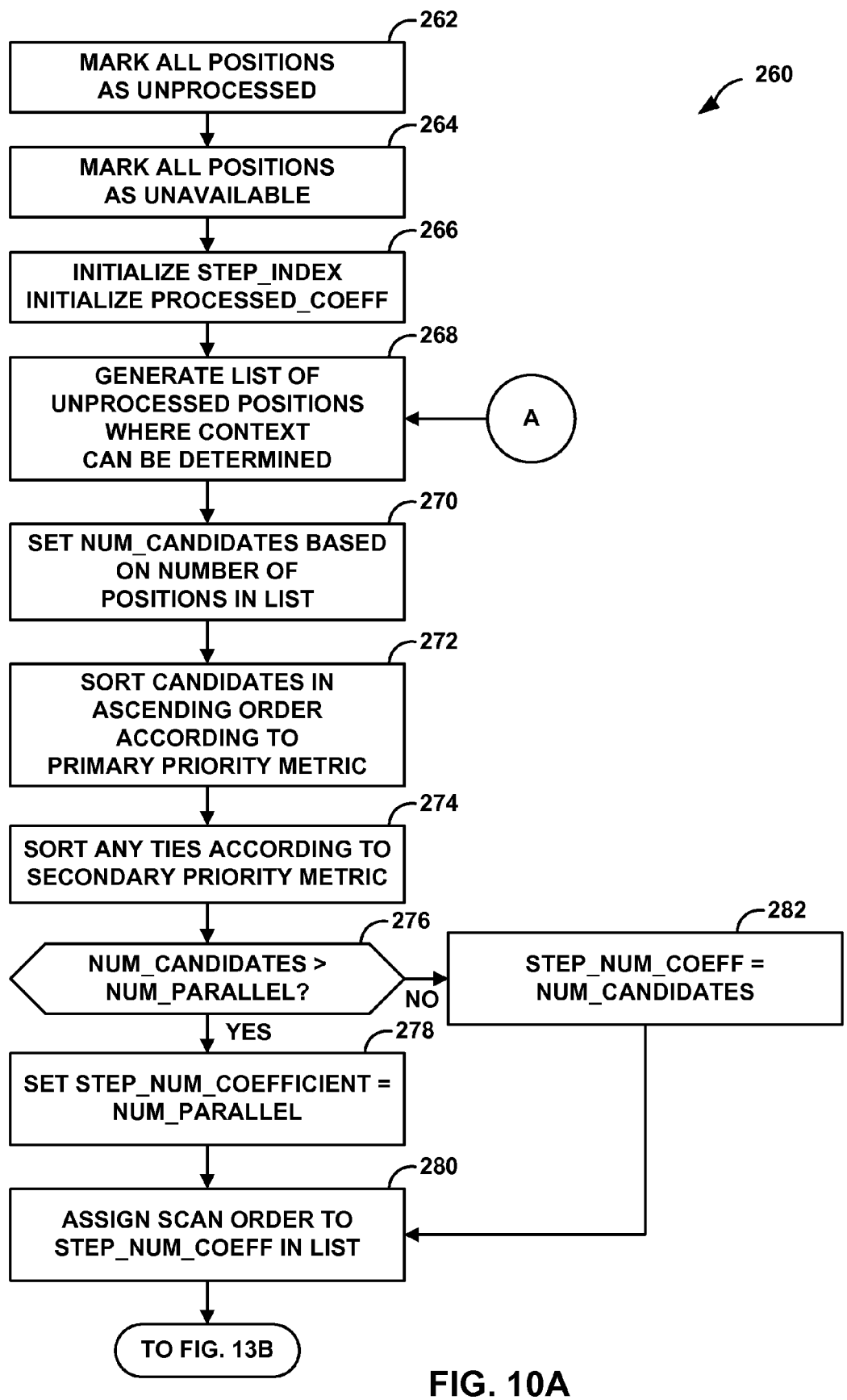
FIG. 10A is a flow chart illustrating an example method of generating a parallel friendly scan order.
Figure 10B:
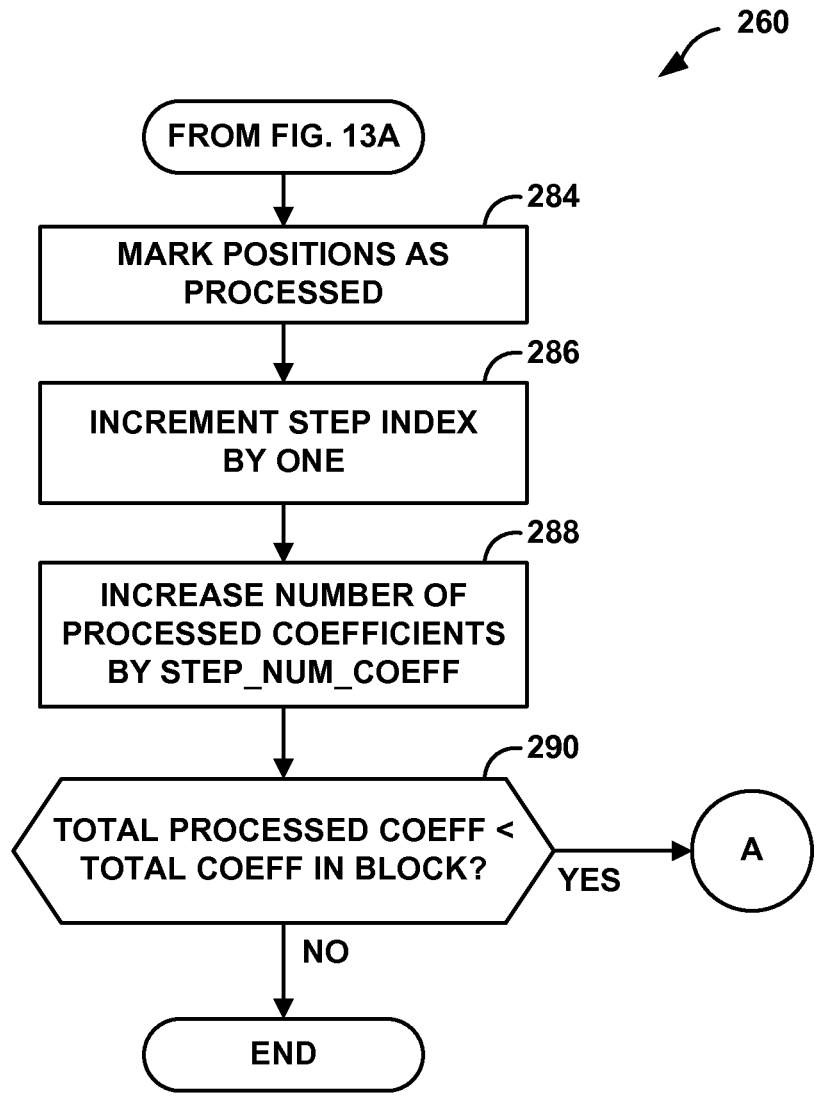
FIG. 10B is a continuation of the example method shown in FIG. 10A.

FIGS. 10A and 10B are flow charts illustrating an example method 260 of generating a parallel friendly scan order. In some examples, the method 260 may use the variables set forth in FIG. 9 to generate a parallel friendly scan order. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method 260 of FIGS. 10A and 10B.

In general, the method can be used to generate a parallel friendly scan order for a particular block of video data having quantized transform coefficients. A "position" may generally refer to a transform coefficient position in the block (which relates to residual video data). Video encoder 20 initially marks all positions of the block as unprocessed (262), as well as marking all positions unavailable (264).

These designations are used to track the status of each position while generating the parallel friendly scan order.

Next, video encoder initializes variables step_index and processed_coeff for use during the parallel friendly scan generation process (266). These variables are typically initialized to zero, and are incremented during scan generation. Next, video encoder 20 generates a list of unprocessed positions where the context support neighborhood can be determined (268). For example, video encoder 20 may identify any positions in the block for which the values of the context support neighborhood are available (e.g., previously coded). Initially, the upper left most position may be the only position for which the context support neighborhood can be determined. Values which are outside the current block can be considered to be not significant. As the block is processed and values are determined, however, additional positions may be added to the list. Video encoder 20 identifies the number of positions in the list and sets a num_candidates variable to the number of positions in the list (270).

Video encoder 20 then sorts the candidates list in ascending order according to the primary priority metric. For example, according to some aspects of the disclosure, each position of the block is assigned an index value based on its relative position in the block. That is, in an example, each position of the block may be assigned a row index (i) and a column index (j). Accordingly, the upper left most position may be assigned an index value of (0,0), while the position to directly to the right of (0,0) may be assigned an index value of (0,1). The position directly beneath position (0,0) may be (1,0), and so on.

According to aspects of this disclosure, the primary priority metric may be a function that utilizes the index values as input variables. For example, as described with respect to FIG. 11A, a primary priority metric may be (i)+(j), thereby combining the row and column index values for a particular position. In another example, as described with respect to FIG. 12A, a primary priority metric may simply be (i), or as described with respect to FIG. 13A, a primary priority metric may simply be (j). It should be understood that these primary priority metrics are provided as merely examples, and other primary priority metrics using other input variables may be used.

The primary priority metric may be used to influence the orientation of the resulting parallel friendly scan order. For example, a primary priority metric of (i) may cause the positions in the rows of the block to be sorted to the top of the candidates list. That is, candidates having a low row index may be sorted higher than candidates having higher row indexes. As described in greater detail below, the positions at the top of the list may cause those positions to be scanned before positions lower on the candidate list.

In some examples, certain positions in the candidates list may be "tied." That is, certain positions in the candidates list may have the same value after applying the primary priority metric. In an example, a primary priority metric of (i)+(j) may produce two positions having the same index value. Such ties may be broken and sorted according to the secondary priority metric (274). The secondary priority metric should be chosen such the first priority metric and the second priority metric do not both result in ties.

Video encoder 20 then determines whether the number of coefficients in the list (e.g., num_candidates) is greater than the desired number of parallel threads (e.g., num_parallel) (276). According to some aspects the number of parallel threads (e.g., num_parallel) may be selected by a developer generating the parallel friendly scan. For example, a developer may set the number of parallel threads (e.g., num_parallel) according to a number of significance flag contexts that are desired to be calculated in parallel. In some cases, the number of parallel threads used by the coding device ultimately using the generated parallel friendly scan order may be constrained by the system. That is, some video coders may be capable of calculating more significance flag contexts in parallel than other coders.

If there are more candidates available in the candidates list than the number of parallel threads (e.g., num_candidates is greater than num_parallel; the "yes branch of step 276), video encoder 20 may process as set a step variable (e.g., step_num_coefficient) that identifies the number of candidates processed in this iteration of the scan generation process, equal to the number of desired parallel threads (278). That is, the number of desired parallel threads may be used to identify how many candidates from the candidates list will be assigned a scan order. In an example, if the desired number of parallel threads may be set to two. Accordingly, video encoder 20 may assign a scan order to two of the candidates from the candidates list. That is, video encoder assigns a scan order to the step number (e.g., step_num_coeff).

If the number of candidates in the list (e.g., num_candidates) is less than the number of desired parallel threads (e.g., num_parallel) (e.g., the "no" branch of step 276), the video encoder 20 will only assign a scan order to the candidates included in the list. That is, video encoder 20 may set the step number (e.g., step_num_coeff) to the number of candidates in the list of candidates (e.g., num_candidates) (282). In an example, if three parallel threads are desired, but only two candidates are included in the candidates list (e.g., only two positions have known contexts), video encoder 20 may only assign a scan order to the number of candidates in the list, i.e., two. Accordingly, video encoder 20 assigns a scan order to the step number (e.g., step_num_coeff) (280).

Continuing to FIG. 10B, video encoder 20 then marks the positions that were assigned a scan order (e.g., in step 280) as processed (284). For example, video encoder 20 marks the positions that have been assigned a scan order as processed so that they are excluded from consideration in the next iteration of the process. Video encoder 20 also increments the step index (e.g., step_index, as initialized at step 266) by one, and increases the number of processed coefficients (e.g., processed_coeff, as initialized at step 266) by the number of positions that were assigned a scan order at step 280 (e.g., step_num_coeff) (288).

If there are still positions in the block that have not yet been assigned a scan order, video encoder 20 may repeat the process until all of the positions in the block have been assigned a scan order. For example, video encoder 20 determines whether the total number of processed positions is less than the total number of positions in the block (290). If there are more positions to be processed (e.g., the "yes" branch of step 290), video encoder 20 may return to step 268 of FIG. 10A (transition marked by the "A" in FIGS. 10A and 10B). If all of the positions have been processed (e.g., the "no" branch of step 290), the process ends.

While described as being carried out by video encoder 20, it should be understood that method 260 shown in FIGS. 10A and 10B may be carried out by a variety of other devices. That is, for example, method 260 may be carried out by a video decoder, such as video decoder 30. In another example, method 260 may be carried out by a developer in a design environment. That is, a developer may vary the variables set forth in steps 232-238 to generate parallel friendly scans having different orientations using the method shown in FIGS. 10A and 10B. The developer may then store the developed scans in video encoder 20 and/or video decoder 30. In addition, the steps of the method of FIG. 9 need not necessarily be performed in the order shown in FIG. 9, and fewer, additional, or alternative steps may be performed.

Figures 11A, 11B:
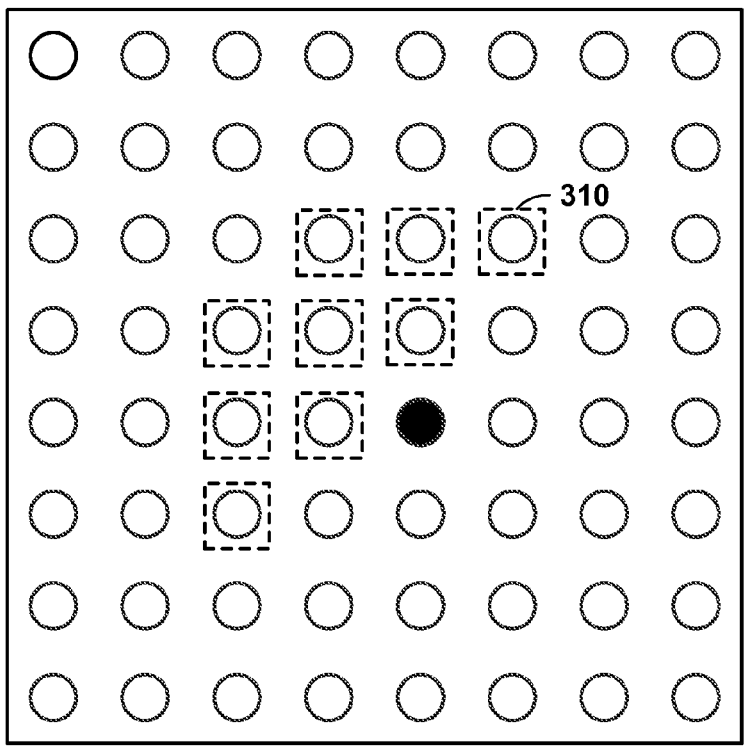
FIG. 11A is a conceptual diagram illustrating an example context support neighborhood for a block of transform coefficients.
FIG. 11B is an example scan order that may be generated using the method shown in FIGS. 10A and 10B and the context support neighborhood shown in FIG. 11A.
Figures 12A, 12B:
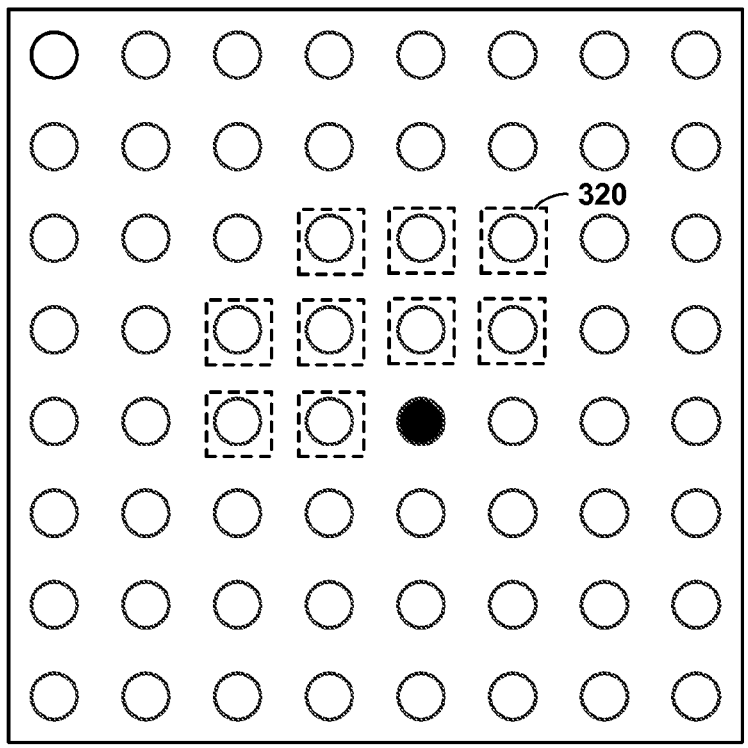
FIG. 12A is a conceptual diagram illustrating another example context support neighborhood for a block of transform coefficients.
FIG. 12B is an example scan order that may be generated using the method shown in FIGS. 10A and 10B and the context support neighborhood shown in FIG. 12A.
Figures 13A, 13B:
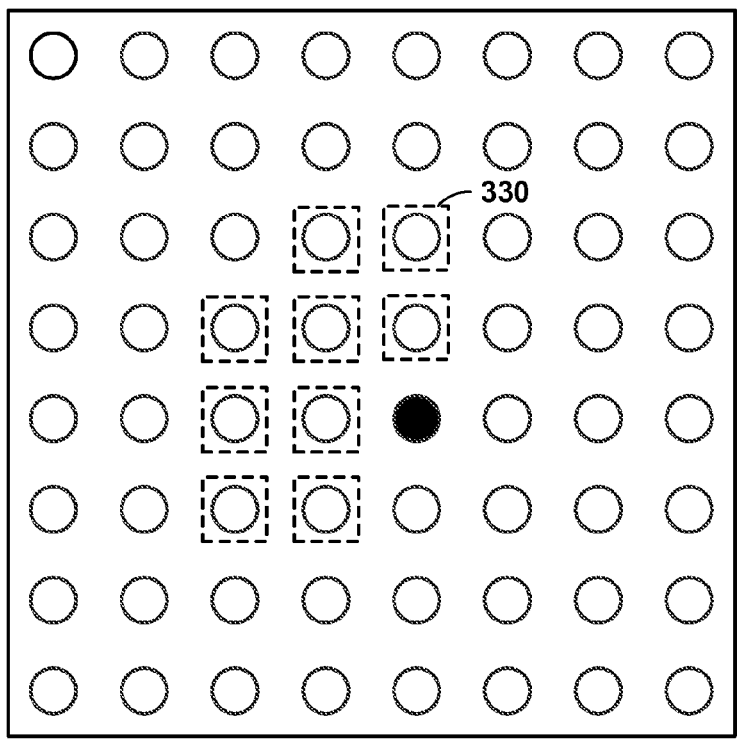
FIG. 13A is a conceptual diagram illustrating another example context support neighborhood for a block of transform coefficients.
FIG. 13B is an example scan order that may be generated using the method shown in FIGS. 10A and 10B and the context support neighborhood shown in FIG. 13A.

FIGS. 11A, 12A, and 13A are conceptual diagrams illustrating example context support neighborhoods (represented by dashed boxes 310, 320, and 330, respectively) for a block of transform coefficients. According to some examples, these context support neighborhoods can be used to develop a parallel friendly scan order according to the method shown in FIGS. 10A and 10B. For example, the context support neighborhoods shown in FIGS. 11A, 12A, and 13A, as well as a primary priority metric, a secondary priority metric, and a desired number of parallel threads may be used to generate parallel friendly scans.

FIGS. 11B, 12B, and 13B are example scan orders 314, 324, and 334, respectively, generated using the method shown in FIGS. 10A and 10B. For example, FIG. 11B is an example scan order that has been generated using the context support neighborhood shown in FIG. 11A, a primary priority metric of (i)+(j), a secondary priority metric of (j), and a desired number of parallel threads (e.g., num_parallel) of two. FIG. 12B is an example scan order that has been generated using the context support neighborhood shown in FIG. 12A, a primary priority metric of (i), a secondary priority metric of (i)+(j), and a desired number of parallel threads (e.g., num_parallel) of three. FIG. 13B is an example scan order that has been generated using the context support neighborhood shown in FIG. 13A, a primary priority metric of (j), a secondary priority metric of (i)+(j), and a desired number of parallel threads (e.g., num_parallel) of three.

In general, FIGS. 11A-13B illustrate how altering the context support neighborhood, the primary priority metric, the secondary priority metric, and the number of desired parallel threads can influence the ordination of the resulting scan. The numbers indicate the position of that transform coefficient within a one dimensional scan. A lower number indicates that transform coefficient appears earlier in the scan. For example, the scan order shown in FIG. 11B has a relatively neutral, or diagonal orientation. That is, the positions are generally scanned from the top-left corner of the block to the bottom-right corner of the block. Alternatively, the scan order shown in FIG. 12B has a relatively strong horizontal orientation. That is, the positions toward the top rows of the block are generally scanned prior to the positions along the bottom rows. In another example, the scan order shown in FIG. 13B has a relatively strong vertical orientation. That is, the positions toward the left columns of the block are generally scanned prior to the positions in the columns to the right.

According to some aspects of this disclosure, parallel friendly scan orders, such as those shown in FIGS. 11A-13B, may be generated by a developer in a design environment. That is, a developer may generate the scan orders prior to storing the parallel friendly scan orders in a coding device, such as video encoder 20 or video decoder 30. A video coder may then have the ability to select a scan having a particular orientation during coding. For example, a video coder may select a parallel friendly scan having a particular orientation based on a coding metric such as a prediction mode or transform used during coding.

Consider, for example, video encoder 20 predicting a CU using a vertical intra-prediction mode. After prediction, transform, and quantization, the nonzero quantized transform coefficients associated with a TU contained in the CU may tend to exist along the horizontal direction (e.g., along the relative top of the two dimensional matrix). Accordingly, it may be beneficial to scan the transform coefficients in the horizontal direction so that the non-zero coefficients in the two dimensional matrix can be further compacted toward the beginning of the resulting one dimensional vector. In this example, video encoder 20 may select the scan order shown in FIG. 12B.

FIGS. 11A-13B are provided as merely examples. It should be understood that other parallel friendly scan orders may be generated using a variety of other context support neighborhoods, priority metrics, and desired number of parallel threads.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for coding video data comprising:
   determining a scan path of a scan pattern for scanning significance information associated with a transform coefficient in a block of transform coefficients, wherein the scan path defines a traversal of the block of transform coefficients in the scan pattern and includes the significance information;
   determining a context support neighborhood for entropy coding the significance information associated with the transform coefficient based on the scan path, such that one or more context support elements that are located in the scan path are excluded from the context support neighborhood;
   determining a context based on the determined context support neighborhood; and
   coding the significance information using the context.

2. The method of claim 1, further comprising:
   determining a second context support neighborhood for second significance information located in the scan path;
   determining a second context based on the second context support neighborhood in parallel with determining the context; and
   coding the second significance information using the second context.

3. The method of claim 1, wherein the scan path is diagonally oriented with respect to the block of transform coefficients such that the context support neighborhood excludes context support elements positioned in the diagonally oriented scan path.

4. The method of claim 3, wherein determining the context support neighborhood comprises determining a context support neighborhood having a first position adjacent to and above the transform coefficient, a second position adjacent to and above the first position, a third position adjacent to and left of the transform coefficient, a fourth position adjacent to and left of the third position, and a fifth position adjacent to and above the third position and adjacent to and left of the first position.

5. The method of claim 1, wherein the scan path is horizontally oriented with respect to the block of transform coefficients such that the context support neighborhood excludes context support elements from the horizontally oriented scan path.

6. The method of claim 1, wherein the scan path is vertically oriented with respect to the block of transform coefficients such that the context support neighborhood excludes context support elements from the vertically oriented scan path.

7. The method of claim 1, wherein coding the significance information comprises encoding the significance information.

8. The method of claim 1, wherein coding the significance information comprises decoding the significance information.

9. The method of claim 1, wherein the context support neighborhood excludes all context support elements that are located in the scan path.

10. The method of claim 1, wherein determining the context support neighborhood based on the scan path comprises excluding a context support element that is located in the scan path and is positioned adjacent to the transform coefficient from the context support neighborhood.

11. An apparatus for coding video data, the apparatus comprising:
    a memory configured to store a block of transform coefficients; and
    one or more processors configured to:
       determine a scan path of a scan pattern for scanning significance information associated with a transform coefficient in the block of transform coefficients, wherein the scan path defines a traversal of the block of transform coefficients in the scan pattern and includes the significance information;
       determine a context support neighborhood for entropy coding the significance information associated with the transform coefficient based on the scan path, such that one or more context support elements that are located in the scan path are excluded from the context support neighborhood;
       determining a context based on the determined context support neighborhood; and
       code the significance information using the context.

12. The apparatus of claim 11, wherein the one or more processors are further configured to:
    determine a second context support neighborhood for second significance information located in the scan path;
    determine a second context based on the second context support neighborhood in parallel with determining the context; and
    code the second significance information using the second context.

13. The apparatus of claim 11, wherein the scan path is diagonally oriented with respect to the block of transform coefficients such that the context support neighborhood excludes context support elements positioned in the diagonally oriented scan path.

14. The apparatus of claim 13, wherein to determine the context support neighborhood, the one or more processors are configured to determine a context support neighborhood having a first position adjacent to and above the transform coefficient, a second position adjacent to and above the first position, a third position adjacent to and left of the transform coefficient, a fourth position adjacent to and left of the third position, and a fifth position adjacent to and above the third position and adjacent to and left of the first position.

15. The apparatus of claim 11, wherein the scan path is horizontally oriented with respect to the block of transform coefficients such that the context support neighborhood excludes context support elements from the horizontally oriented scan path.

16. The apparatus of claim 11, wherein the scan path is vertically oriented with respect to the block of transform coefficients such that the context support neighborhood excludes context support elements from the vertically oriented scan path.

17. The apparatus of claim 11, wherein the context support neighborhood excludes all context support elements that are located in the scan path.

18. The apparatus of claim 11, wherein to determine the context support neighborhood based on the scan path, the one or more processors are configured to exclude a context support element that is located in the scan path and is positioned adjacent to the transform coefficient from the context support neighborhood.

19. The apparatus of claim 11, wherein the apparatus comprises a video decoder.

20. The apparatus of claim 11, wherein the apparatus comprises a video encoder.

21. The apparatus of claim 11, wherein the apparatus comprises a mobile device.

22. An apparatus for coding video data comprising:
means for determining a scan path of a scan pattern for scanning significance information associated with a transform coefficient in a block of transform coefficients, wherein the scan path defines a traversal of the block of transform coefficients in the scan pattern and includes the significance information;
means for determining a context support neighborhood for entropy coding the significance information associated with the transform coefficient based on the scan path, such that one or more context support elements that are located in the scan path are excluded from the context support neighborhood;
means for determining a context based on the determined context support neighborhood; and
means for coding the significance information using the context.

23. The apparatus of claim 22, further comprising:
means for determining a second context support neighborhood for second significance information located in the scan path;
means for determining a second context based on the second context support neighborhood in parallel with determining the context; and
means for coding the second significance information using the second context.

24. The apparatus of claim 22, wherein the scan path is diagonally oriented with respect to the block of transform coefficients such that the context support neighborhood excludes context support elements positioned in the diagonally oriented scan path.

25. The apparatus of claim 24, wherein the means for determining the context support neighborhood comprises means for determining a context support neighborhood having a first position adjacent to and above the transform coefficient, a second position adjacent to and above the first position, a third position adjacent to and left of the transform coefficient, a fourth position adjacent to and left of the third position, and a fifth position adjacent to and above the third position and adjacent to and left of the first position.

26. The apparatus of claim 22, wherein the scan path is horizontally oriented with respect to the block of transform coefficients such that the context support neighborhood excludes context support elements from the horizontally oriented scan path.

27. The apparatus of claim 22, wherein the scan path is vertically oriented with respect to the block of transform coefficients such that the context support neighborhood excludes context support elements from the vertically oriented scan path.

28. The apparatus of claim 22, wherein the context support neighborhood excludes all context support elements that are located in the scan path.

29. The apparatus of claim 22, wherein the means for determining the context support neighborhood based on the scan path comprises means for excluding a context support element that is located in the scan path and is positioned adjacent to the transform coefficient from the context support neighborhood.

30. A non-transitory computer-readable medium having stored thereon instructions that, when executed, cause one or more processors to:
determine a scan path of a scan pattern for scanning significance information associated with a transform coefficient in a block of transform coefficients, wherein the scan path defines a traversal of the block of transform coefficients in the scan pattern and includes the significance information;
determine a context support neighborhood for entropy coding the significance information associated with the transform coefficient based on the scan path, such that one or more context support elements that are located in the scan path are excluded from the context support neighborhood;
determine a context based on the determined context support neighborhood; and
code the significance information using the context.

31. The non-transitory computer-readable medium of claim 30, wherein the instructions further cause the one or more processors to:
determine a second context support neighborhood for second significance information located in the scan path;
determine a second context based on the second context support neighborhood in parallel with determining the context; and
code the second significance information using the second context.

32. The non-transitory computer-readable medium of claim 30, wherein the scan path is diagonally oriented with respect to the block of transform coefficients such that the context support neighborhood excludes context support elements positioned in the diagonally oriented scan path.

33. The non-transitory computer-readable medium of claim 32, wherein to determine the context support neighborhood, the instructions cause one or more processors to determine a context support neighborhood having a first position adjacent to and above the transform coefficient, a second position adjacent to and above the first position, a third position adjacent to and left of the transform coefficient, a fourth position adjacent to and left of the third position, and a fifth position adjacent to and above the third position and adjacent to and left of the first position.

34. The non-transitory computer-readable medium of claim 30, wherein the scan path is horizontally oriented with respect to the block of transform coefficients such that the context support neighborhood excludes context support elements from the horizontally oriented scan path.

35. The non-transitory computer-readable medium of claim 30, wherein the scan path is vertically oriented with respect to the block of transform coefficients such that the context support neighborhood excludes context support elements from the vertically oriented scan path.

36. The non-transitory computer-readable medium of claim 30, wherein the context support neighborhood excludes all context support elements that are located in the scan path.

37. The non-transitory computer-readable medium of claim 30, wherein to determine the context support neighborhood based on the scan path, the instructions cause the one or more processors to exclude a context support element that is located in the scan path and is positioned adjacent to the transform coefficient from the context support neighborhood.

38. The method of claim 1, wherein the scan pattern includes a plurality of scan paths, each of the scan paths being a single traversal across the block, and wherein determining the context support neighborhood based on the scan path comprises determining the context support neighborhood based on one of the scan paths of the plurality of scan paths.

* * * * *

UNITED STATES PATENT AND TRADEMARK OFFICE
CERTIFICATE OF CORRECTION

| | | |
|---|---|---|
| PATENT NO. | : 9,497,472 B2 | |
| APPLICATION NO. | : 13/294869 | |
| DATED | : November 15, 2016 | |
| INVENTOR(S) | : Muhammed Zeyd Coban et al. | |

It is certified that error appears in the above-identified patent and that said Letters Patent is hereby corrected as shown below:

In the Claims

Claims 34-38, Column 42, Line 58 through Column 43, Line 18, should be deleted and replaced with the following:

--34. The method of claim 1, wherein the scan pattern includes a plurality of scan paths, each of the scan paths being a single traversal across the block, and wherein determining the context support neighborhood based on the scan path comprises determining the context support neighborhood based on one of the scan paths of the plurality of scan paths.

35. The method of claim 1, wherein the block of transform coefficients corresponds to a block of video data, and wherein the method is executable on a wireless communication device that comprises:
    a memory configured to store the block of video data;
    a processor configured to execute instructions to process the block of video data stored in said memory; and
    a receiver configured to receive the block of video data.

36. The method of claim 35, wherein the wireless communication device is a cellular telephone and the block of video data is received by the receiver and modulated according to a cellular communication standard.

37. The apparatus of claim 11, wherein the apparatus is a wireless communication device, the wireless communication device comprising a receiver configured to receive a block of video data corresponding to the block of transform coefficients.

38. The apparatus of claim 37, wherein the wireless communication device is a cellular telephone and the block of video data is received by the receiver and modulated according to a cellular communication standard.--

Signed and Sealed this
Seventeenth Day of April, 2018

Andrei Iancu
*Director of the United States Patent and Trademark Office*